US012506364B2

(12) United States Patent
Staring et al.

(10) Patent No.: US 12,506,364 B2
(45) Date of Patent: Dec. 23, 2025

(54) WIRELESS POWER TRANSFER

(71) Applicant: KONINKLIJKE PHILIPS N.V., Eindhoven (NL)

(72) Inventors: Antonius Adriaan Maria Staring, Eindhoven (NL); Aleksei Agafonov, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 18/724,670

(22) PCT Filed: Dec. 27, 2022

(86) PCT No.: PCT/EP2022/087850
§ 371 (c)(1),
(2) Date: Jun. 27, 2024

(87) PCT Pub. No.: WO2023/131564
PCT Pub. Date: Jul. 13, 2023

(65) Prior Publication Data
US 2025/0079895 A1    Mar. 6, 2025

(30) Foreign Application Priority Data

Jan. 4, 2022 (EP) .................................... 22150125

(51) Int. Cl.
*H02J 50/12* (2016.01)
*H02J 50/80* (2016.01)
(Continued)

(52) U.S. Cl.
CPC .............. *H02J 50/12* (2016.02); *H02J 50/80* (2016.02); *H04B 5/26* (2024.01); *H04B 5/79* (2024.01)

(58) Field of Classification Search
CPC . H02J 50/12; H02J 50/80; H02J 50/10; H04B 5/26; H04B 5/79
See application file for complete search history.

(56) References Cited

U.S. PATENT DOCUMENTS 10,886,782 B2 *   1/2021   Ettes ...................... H04B 5/266
11,476,720 B2 * 10/2022   Ettes ...................... H02J 50/10
(Continued)

FOREIGN PATENT DOCUMENTS

EP           3787151  A1    3/2021

OTHER PUBLICATIONS

Qi Specification.
International Search Report and Written Opinion from PCT/EP2022/0881WO mailed Mar. 29, 2023.

*Primary Examiner* — Rexford N Barnie
*Assistant Examiner* — Michael J Warmflash

(57) ABSTRACT

A power receiver (105) communicates to a power transmitter (101) using load modulation data symbols modulated by a chip sequence with a chip sequence being divided into load time intervals with different modulation loads. The power transmitter (101) comprises a receiver (207) which includes a load measurer (209) determining measured load values of the power transfer signal for load time intervals. A chip determiner circuit (211) determines a received chip sequence from the measured load values where the received chip sequence comprises a sequence of chip values. Each chip value is determined in response to a difference between measured load values for at least two modulation load time intervals of the chip. A store (215) stores a set of chip sequences with each chip sequence linked to a data symbol. A detector (213) detects a received data symbol value in response to a correlation between the received chip sequence and chip sequences of the set of chip sequences.

16 Claims, 18 Drawing Sheets

(51) Int. Cl.
*H04B 5/26* (2024.01)
*H04B 5/79* (2024.01)

(56) References Cited

U.S. PATENT DOCUMENTS

| | | | | |
|---|---|---|---|---|
| 11,916,403 | B2* | 2/2024 | Agafonov | H02J 50/80 |
| 12,348,057 | B2* | 7/2025 | Van Vugt | H02J 50/12 |
| 2005/0231330 | A1* | 10/2005 | Drews | G06K 7/0008 |
| | | | | 340/10.51 |
| 2016/0087691 | A1* | 3/2016 | Van Wageningen | H02J 50/80 |
| | | | | 307/104 |
| 2017/0310119 | A1* | 10/2017 | Taylor | H04B 5/79 |
| 2018/0342899 | A1* | 11/2018 | Joye | H02J 50/80 |
| 2019/0097459 | A1* | 3/2019 | Ettes | H02J 50/12 |
| 2020/0227952 | A1* | 7/2020 | Martchovsky | H02J 50/10 |
| 2020/0395793 | A1* | 12/2020 | Ettes | H02J 7/00308 |
| 2022/0200352 | A1* | 6/2022 | Ettes | H02J 50/00 |
| 2022/0294274 | A1* | 9/2022 | Van Vugt | H02J 50/80 |
| 2022/0302760 | A1* | 9/2022 | Agafonov | H02J 50/60 |
| 2023/0006547 | A1* | 1/2023 | Han | H02M 7/5395 |
| 2023/0017317 | A1* | 1/2023 | Ettes | H02J 7/00308 |
| 2024/0272207 | A1* | 8/2024 | Qiu | G01R 35/005 |
| 2025/0233456 | A1* | 7/2025 | Agafonov | H02J 50/80 |

* cited by examiner

WIRELESS POWER TRANSFER

CROSS-REFERENCE TO PRIOR APPLICATIONS

This application is the U.S. National Phase application under 35 U.S.C. § 371 of International Application No. PCT/EP2022/087850, filed on Dec. 27, 2022, which claims the benefit of EP Patent Application No. EP 22150125.7, filed on Jan. 4, 2022. These applications are hereby incorporated by reference herein.

FIELD OF THE INVENTION

The invention relates to wireless power transfer and in particular, but not exclusively, to communication in a power transfer system such as the Qi wireless power transfer Specification.

BACKGROUND OF THE INVENTION

Most present-day electrical products require a dedicated electrical contact in order to be powered from an external power supply. However, this tends to be impractical and requires the user to physically insert connectors or otherwise establish a physical electrical contact. Typically, power requirements also differ significantly, and currently most devices are provided with their own dedicated power supply resulting in a typical user having a large number of different power supplies with each power supply being dedicated to a specific device. Although, the use of internal batteries may avoid the need for a wired connection to a power supply during use, this only provides a partial solution as the batteries will need recharging (or replacing). The use of batteries may also add substantially to the weight and potentially cost and size of the devices.

In order to provide a significantly improved user experience, it has been proposed to use a wireless power supply wherein power is inductively transferred from a transmitter coil in a power transmitter device to a receiver coil in the individual devices.

Power transmission via magnetic induction is a well-known concept, mostly applied in transformers having a tight coupling between a primary transmitter inductor/coil and a secondary receiver coil. By separating the primary transmitter coil and the secondary receiver coil between two devices, wireless power transfer between these becomes possible based on the principle of a loosely coupled transformer.

Such an arrangement allows a wireless power transfer to the device without requiring any wires or physical electrical connections to be made. Indeed, it may simply allow a device to be placed adjacent to, or on top of, the transmitter coil in order to be recharged or powered externally. For example, power transmitter devices may be arranged with a horizontal surface on which a device can simply be placed in order to be powered.

Furthermore, such wireless power transfer arrangements may advantageously be designed such that the power transmitter device can be used with a range of power receiver devices. In particular, a wireless power transfer approach, known as the Qi Specifications, has been defined and is currently being developed further. This approach allows power transmitter devices that meet the Qi Specifications to be used with power receiver devices that also meet the Qi Specifications without these having to be from the same manufacturer or having to be dedicated to each other. The Qi standard further includes some functionality for allowing the operation to be adapted to the specific power receiver device (e.g. dependent on the specific power drain).

The Qi Specification is developed by the Wireless Power Consortium and more information can e.g. be found on their website: http://www.wirelesspowerconsortium.com/index.html, where in particular the defined Specification documents can be found.

In order to support efficient wireless power transfer, wireless power transfer systems, such as Qi based systems, utilize substantial communication between the power transmitter and the power receiver. Initially, Qi supported only communication from the power receiver to the power transmitter using load modulation of the power transfer signal. Thus, initial Qi devices support only unidirectional communication from the power receiver to the power transmitter.

However, developments of the standard have introduced bidirectional communication and many functions are supported by communication exchanges between the power receiver and the power transmitter. In many systems, the communication from the power transmitter to the power receiver is accomplished by modulating the power transfer signal.

In some systems, it has been proposed to use separate and dedicated communication functionality such as e.g. Bluetooth or NFC (Near Field Communication) based communication. However, whereas such approaches may tend to provide efficient operation in many scenarios it is also associated with a number of disadvantages, including requiring dedicated and complex communication circuitry and potentially a reduced certainty that the power transmitter is indeed communicating with the power receiver that is being supplied with power. Also, backwards compatibility, e.g. with Qi based devices, may be problematic for newer devices based on separate communication.

Communicating using load modulation of the power transfer signal transferring power to the power receiver may however also tend to have some associated disadvantages. For example, the load modulation may tend to introduce some electrical noise including both noise to the signals of the devices as well as radiated electromagnetic noise. The load modulation may increase electromagnetic interference to other devices and maintaining sufficient or optimal electromagnetic compatibility has been found to be challenging.

It has also been found in practice that load modulation may result in the introduction of undesired spurious oscillations to the drive signal and the power transfer signal. Another disadvantage is that the load modulation of the power transfer signal may result in acoustic noise. Such noise may result from the impact on mechanical elements of the variations to the electromagnetic field caused by the load modulation, and specifically it may cause mechanical elements to move and vibrate resulting in potential acoustic noise being generated.

In some cases, load modulation communication as e.g. used in the initial versions of the Qi Specifications may not have perfect reliability and some bit errors may possibly occur in some cases. For example, high levels of noise may result in bit errors and/or may require an increased modulation depth which may result in increased electrical or acoustic noise resulting from the load modulation.

Although it may in some ways be desired to change to a different communication approach, maintaining backwards compatibility or reducing the amount of change needed for existing designs and approaches is a prime challenge that often renders this unattractive.

Hence, an improved approach would be advantageous, in particular, an approach allowing increased flexibility, reduced cost, reduced complexity, improved power transfer operation, increased reliability, reduced communication errors, improved backwards compatibility, improved electromagnetic compatibility, reduced electrical and/or acoustic noise, improved communication, and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided a power transmitter for wirelessly providing power to a power receiver via an electromagnetic power transfer signal, the power transmitter comprising: an output circuit comprising a transmitter coil arranged to generate the power transfer signal in response to a drive signal being applied to the output circuit; a driver arranged to generate the drive signal; a receiver arranged to receive load modulation data symbols modulated by a chip sequence, each chip of a chip sequence having a duration divided into a plurality of load time intervals, a modulation load of the load modulation being different for consecutive time intervals of the plurality of load time intervals, and a modulation load pattern formed by modulation loads of the plurality of load time intervals being different for different chip values of each chip; wherein the receiver comprises: a load measurer arranged to measure loading of the power transfer signal to determine measured load values for load time intervals; a chip determiner circuit arranged to determine a received chip sequence from the measured load values, the received chip sequence comprising a sequence of chip values, each chip value being determined in response to a difference between measured load values for at least two modulation load time intervals of the chip; a store arranged to store a set of chip sequences with each chip sequence being linked to a data symbol; a detector is arranged to detect a received data symbol value in response to a correlation between the received chip sequence and chip sequences of the set of chip sequences.

The invention may allow improved performance in many embodiments and may in particular in many embodiments allow improved communication between a power receiver and a power transmitter. It may allow improved power transfer in many embodiments.

The approach may allow improved communication, and in many embodiments may allow improved trade-off between different parameters and operating characteristics. The approach may e.g. allow highly reliable communication yet allow reduced modulation depth to be used. The approach may reduce electric noise and/or electromagnetic interference and allow improved electromagnetic compatibility. The approach may in many cases reduce or prevent acoustic noise. Further, the approach may provide advantageous backwards compatibility and e.g. may allow relatively easy modification of existing approaches, such as those used by the Qi Specifications. The approach may often reuse much functionality from such existing approaches. The approach may allow for low complexity implementation yet provide highly efficient performance. The communication approach may be particularly advantageous for use in power transfer systems as bandwidth considerations may be less critical in such systems.

The approach may in many scenarios allow an improved trade-off between different parameters including computational resource requirements, data detection accuracy, bit error rate, data rate etc.

The approach may in many embodiments allow improved and/or facilitated detection of load modulation data at the power transmitter. It may in many scenarios reduce or remove the need to determine average or nominal load reference levels in order to detect modulation load levels and variations. For example, chip values can in many embodiments be determined considering only modulation load values within the chip itself.

In many scenarios, the load modulation for an individual chip may not only indicate the chip value but may also provide a reference load value for the determination of the chip value.

In many scenarios, a reduced sensitivity to temporal variations, noise, distortion etc. can be achieved for the communication of data from a power receiver to a power transmitter.

A chip sequence may be a sequence/pattern of chip values. Each of these modulation load values may be constant within a load time interval. Chip sequences for different data symbols have different sequences/patterns of chip values.

In many embodiments, the length of the chip sequences is not below 10 and not above 1024 chips.

The measured load values may be samples of a signal indicative of the load of the power transfer signal. The measured load values may be samples of a parameter of the drive signal.

The load measurer may be arranged to determine one measured load value for each load time interval.

The load measurer may be arranged to measure a loading/load of the power transfer signal (specifically by the power receiver) to determine measured load values for load time intervals.

Each chip of a chip sequence may be represented by a modulation load pattern, different chip values being represented by different modulation load patterns, and each modulation load pattern being formed by a sequence of load time intervals, a modulation load value being constant within each load time interval and changing between different time intervals.

Each chip of a chip sequence may be divided into at least two load time intervals having different modulation loads, the pattern of different modulation loads being different for different chip values.

In accordance with an optional feature of the invention, each chip of a chip sequence is divided into two load time intervals having different modulation loads.

This may allow improved performance and/or facilitated operation and/or reduced complexity.

In accordance with an optional feature of the invention, each chip of a chip sequence is divided into no less than three load time intervals having different modulation loads. This may allow improved performance and/or facilitated operation and/or reduced complexity.

In some embodiments, each chip of a chip sequence is divided into no less than three load time intervals with adjacent load time intervals of the chip having different modulation loads.

In accordance with an optional feature of the invention, the load measurer is arranged to synchronize measurement of the load of the power transfer signal to cycles of the power transfer signal.

This may allow improved performance and/or facilitated operation and/or reduced complexity. It may in particular allow an improved and/or facilitated determination of suitable load values for data symbol detection.

In accordance with an optional feature of the invention, each load time interval has a duration of one cycle of the power transfer signal.

This may allow improved performance and/or facilitated operation and/or reduced complexity. It may in many scenarios allow increased data rate.

In accordance with an optional feature of the invention, each load time interval has a duration of a plurality cycles of the power transfer signal.

This may allow improved performance and/or facilitated operation and/or reduced complexity. It may in some embodiments, provide reduced sensitivity to synchronization errors.

In accordance with an optional feature of the invention, the load measurer is arranged to perform a single load measurement per load time interval.

This may allow improved performance and/or facilitated operation and/or reduced complexity.

In accordance with an optional feature of the invention, the chip determiner is arranged to determine a binary chip value for a chip as a function of a sign of the difference between measured load value for two modulation load time intervals for the chip.

This may allow improved performance and/or facilitated operation and/or reduced complexity.

In accordance with an optional feature of the invention, the chip determiner is arranged to determine the received chip sequence to comprise soft-decision chip values in response to a magnitude of the difference between measured load values for two modulation load time intervals for the chips, and the detector is arranged to perform the correlation with the chip sequences of the set of chip sequences in response to the soft-decision chip values.

This may allow improved performance and/or facilitated operation and/or reduced complexity.

In accordance with an optional feature of the invention, the pattern of different modulation loads is a pattern of binary modulation load values.

This may allow improved performance and/or facilitated operation and/or reduced complexity.

According to an aspect of the invention there is provided a power receiver for wirelessly receiving power from a power transmitter via an electromagnetic power transfer signal, the power receiver comprising: an input circuit comprising a receiver coil arranged to extract power from the power transfer signal; a transmitter arranged to transmit data symbols to the power transmitter by load modulating the power transfer signal, each data symbol being modulated by a sequence of modulation load values corresponding to a chip sequence of a set of chip sequences, chip sequences of the set of chip sequences being linked to different data symbol values; wherein the transmitter is arranged to modulate the power transfer signal by dividing a duration of each chip of a chip sequence into a plurality of load time intervals, a modulation load of the load modulation being different for consecutive time intervals of the plurality of load time intervals, and a modulation load pattern formed by modulation loads of the plurality of load time intervals being different for different chip values of each chip.

In accordance with an optional feature of the invention, the transmitter is arranged to synchronize the at least two load time intervals to cycles of the power transfer signal.

According to an aspect of the invention there is provided a method of operation for a power transmitter wirelessly providing power to a power receiver via an electromagnetic power transfer signal, the power transmitter comprising: an output circuit comprising a transmitter coil arranged to generate the power transfer signal in response to a drive signal being applied to the output circuit; a driver arranged to generate the drive signal; a receiver arranged to receive load modulation data symbols modulated by a chip sequence, each chip of a chip sequence having a duration divided into a plurality of load time intervals, a modulation load of the load modulation being different for consecutive time intervals of the plurality of load time intervals, and a modulation load pattern formed by modulation loads of the plurality of load time intervals being different for different chip values of each chip; wherein the method comprises the receiver performing the steps of: measuring loading of the power transfer signal to determine measured load values for load time intervals; determining a received chip sequence from the measured load values, the received chip sequence comprising a sequence of chip values, each chip value being determined in response to a difference between measured load values for at least two modulation load time intervals of the chip; storing a set of chip sequences with each chip sequence being linked to a data symbol; and detecting a received data symbol value in response to a correlation between the received load chip sequence and chip sequences of the set of chip sequences.

According to an aspect of the invention there is provided a method of operation for a power receiver wirelessly receiving power from a power transmitter via an electromagnetic power transfer signal, the method comprising: an input circuit comprising a receiver coil extracting power from the power transfer signal; and transmit data symbols to the power transmitter by load modulating the power transfer signal, each data symbol being modulated by a sequence of modulation load values corresponding to a chip sequence of a set of chip sequences, chip sequences of the set of chip sequences being linked to different data symbol values; wherein transmitting the data symbols include modulating the power transfer signal by dividing a duration of each chip of a chip sequence into a plurality of load time intervals, a modulation load of the load modulation being different for consecutive time intervals of the plurality of load time intervals, and a modulation load pattern formed by modulation loads of the plurality of load time intervals being different for different chip values of each chip.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF EMBODIMENTS

The following description focuses on embodiments of the invention applicable to a high power wireless power transfer system utilizing a power transfer approach such as known from the Qi Specification or the Ki Specification. However, it will be appreciated that the invention is not limited to this application but may be applied to many other wireless power transfer systems.

Figure 1:
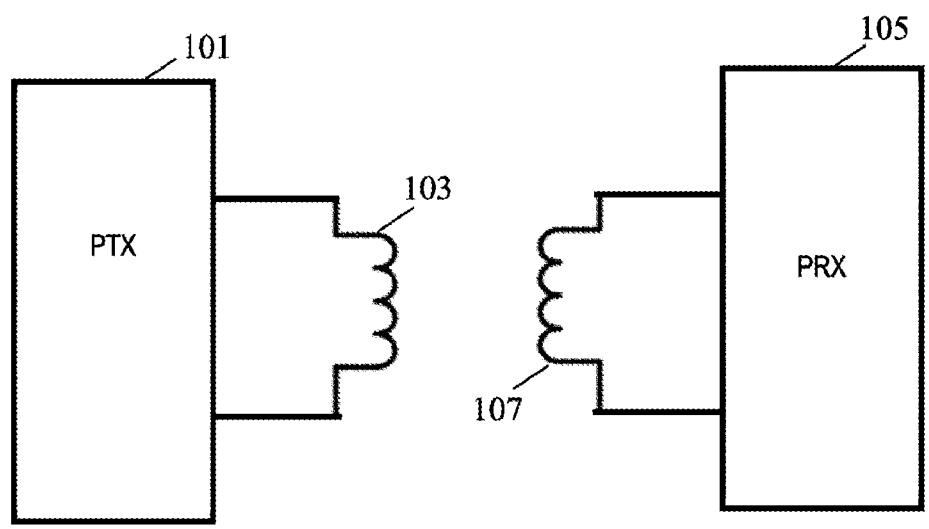
FIG. 1 illustrates an example of elements of a power transfer system in accordance with some embodiments of the invention.

FIG. 1 illustrates an example of a power transfer system in accordance with some embodiments of the invention. The power transfer system comprises a power transmitter 101 which includes (or is coupled to) a transmitter coil/inductor 103. The system further comprises a power receiver 105 which includes (or is coupled to) a receiver coil/inductor 107.

The system provides an inductive electromagnetic power transfer signal which may inductively transfer power from the power transmitter 101 to the power receiver 105. Specifically, the power transmitter 101 generates an electromagnetic signal, which is propagated as a magnetic flux by the transmitter coil or inductor 103. The power transfer signal may typically have a frequency between around 20 kHz to around 500 kHz, and in many practical systems may be around 120-150 KHz. The transmitter coil 103 and the power receiving coil 107 are loosely coupled and thus the power receiving coil 107 picks up (at least part of) the power transfer signal from the power transmitter 101. Thus, the power is transferred from the power transmitter 101 to the power receiver 105 via a wireless inductive coupling from the transmitter coil 103 to the power receiving coil 107. The term power transfer signal is mainly used to refer to the inductive signal/magnetic field between the transmitter coil 103 and the power receiving coil 107 (the magnetic flux signal), but it will be appreciated that by equivalence it may also be considered and used as a reference to an electrical signal provided to the transmitter coil 103 or picked up by the power receiving coil 107.

In the example, the power receiver 105 is specifically a power receiver that receives power via the receiver coil 107. However, in other embodiments, the power receiver 105 may comprise a metallic element, such as a metallic heating element, in which case the power transfer signal directly induces eddy currents resulting in a direct heating of the element.

In the following, the operation of the power transmitter 101 and the power receiver 105 will be described with specific reference to an embodiment generally in accordance with the Qi Specifications (except for the herein described (or consequential) modifications and enhancements).

Many wireless power transfer systems utilize resonant power transfer where the transmitter coil 103 is part of a resonance circuit and typically the receiver coil 107 is also part of a resonance circuit. In many embodiments, the resonance circuits may be series resonance circuits and thus the transmitter coil 103 and the receiver coil 107 may be coupled in series with a corresponding resonance capacitor. The use of resonance circuits tends to provide a more efficient power transfer.

Normally, a wireless power transfer system employs a power control loop in order to steer the system towards the appropriate operating point. This power control loop changes the amount of power that is transmitted from the power transmitter to the power receiver. The received power (or voltage or current) can be measured and together with the setpoint power value, an error signal can be generated. The power receiver sends this error signal to the power control function in the power transmitter to reduce the static error, ideally to zero.

Figure 2:
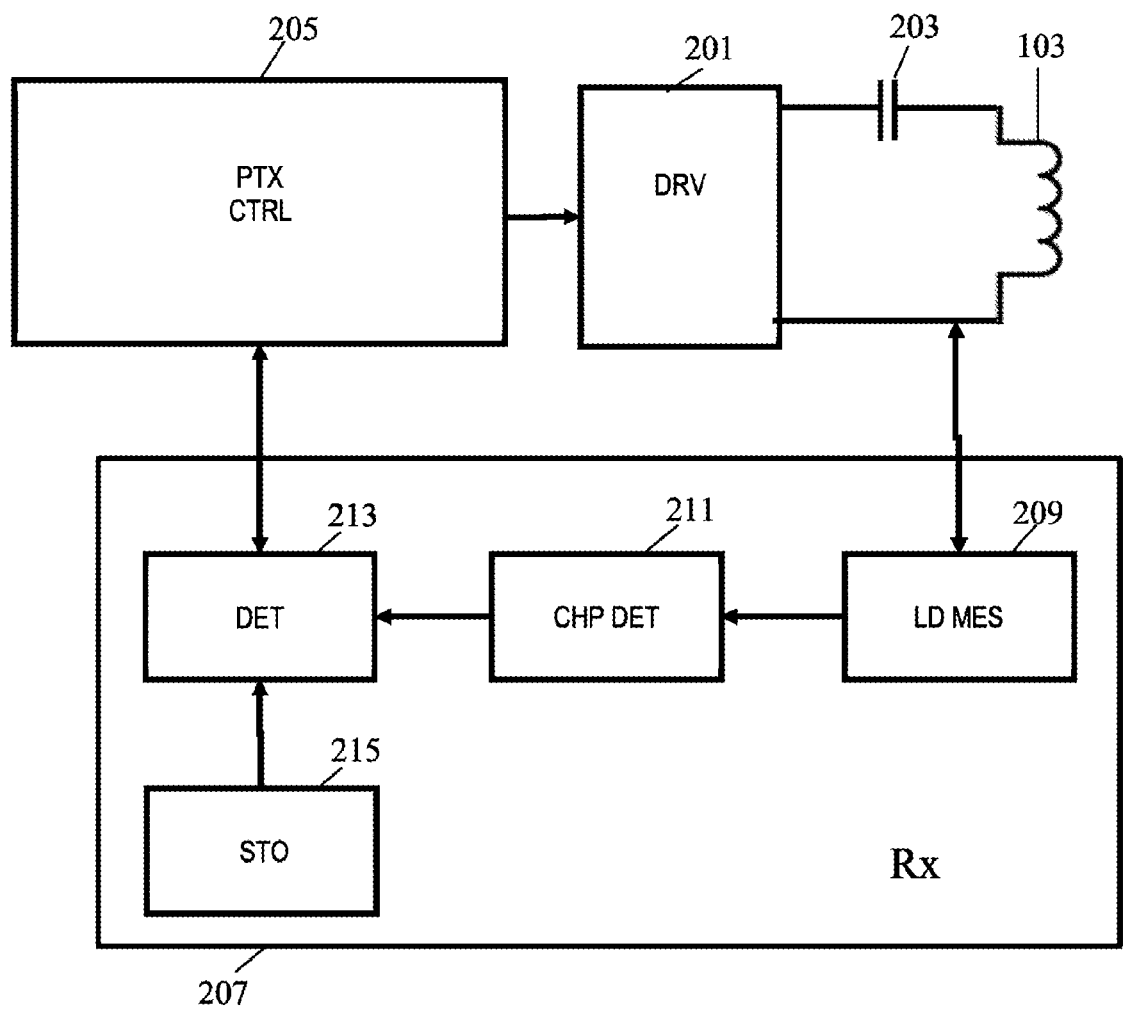
FIG. 2 illustrates an example of elements of a power transmitter in accordance with some embodiments of the invention.

FIG. 2 illustrates elements of the power transmitter 101 of FIG. 1 in more detail.

The power transmitter 101 includes a driver 201 which can generate a drive signal that is fed to the transmitter coil 103 which in return generates the electromagnetic power transfer signal thereby providing a power transfer to the power receiver 105. The transmitter coil 103 is part of an output resonance circuit which comprises the transmitter coil 103 and a capacitor 203. In the example, the output resonance circuit is a series resonance circuit, but it will be appreciated that in other embodiments, the output resonance circuit may be a parallel resonance circuit. It will be appreciated that any suitable resonance circuit may be used including one using multiple inductors and/or capacitors.

Figure 3:
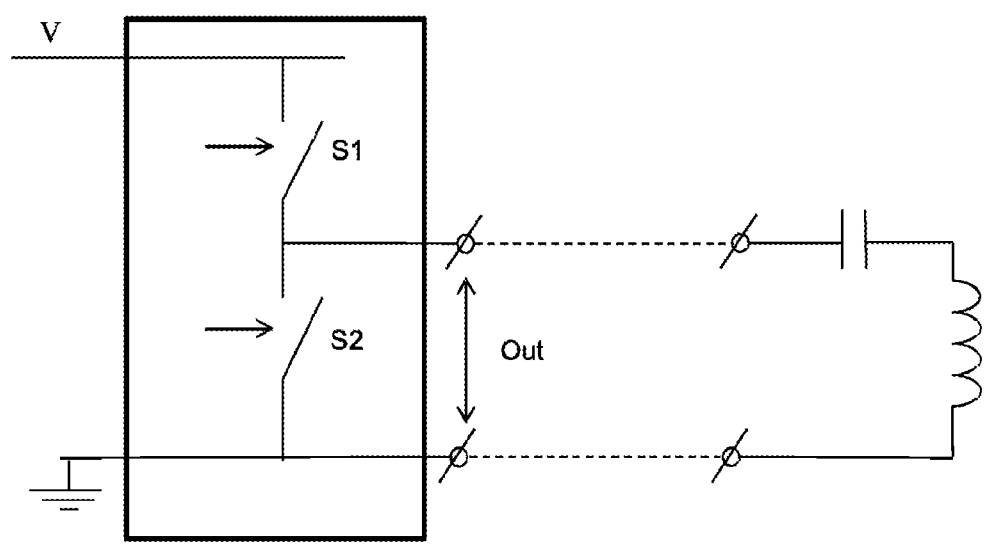
FIG. 3 illustrates an example of a half bridge inverter for a power transmitter.
Figure 4:
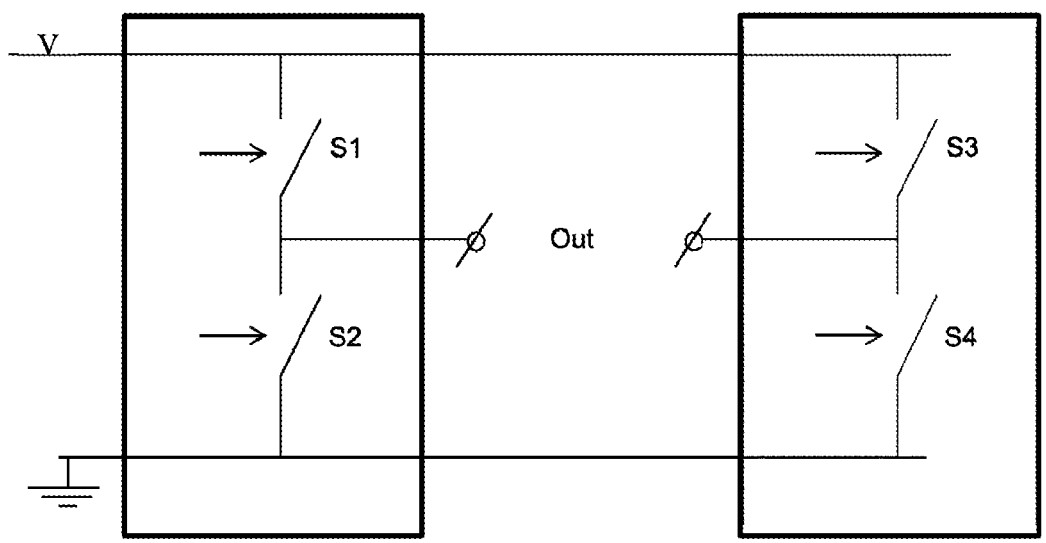
FIG. 4 illustrates an example of a full bridge inverter for a power transmitter.

The driver 201 generates the current and voltage which is fed to the output resonance circuit and thus to the transmitter coil 103. The driver 201 is typically a drive circuit in the form of an inverter which generates an alternating signal from a DC Voltage. The output of the driver 201 is typically a switch bridge generating the drive signal by the appropriate switching of switches of the switch bridge. FIG. 3 shows a half-bridge switch bridge/inverter. The switches S1 and S2 are controlled such that they are never closed at the same time. Alternatingly S1 is closed while S2 is open and S2 is closed while S1 is open. The switches are opened and closed with the desired frequency, thereby generating an alternating signal at the output. Typically, the output of the inverter is connected to the transmitter inductor via a resonance capacitor. FIG. 4 shows a full-bridge switch bridge/inverter. The switches S1 and S2 are controlled such that they are never closed at the same time. The switches S3 and S4 are controlled such that they are never closed at the same time. Alternatingly switches S1 and S4 are closed while S2 and S3 are open, and then S2 and S3 are closed while S1 and S4 or open, thereby creating a square-wave signal at the output. The switches are opened and closed with the desired frequency.

The power transmitter 101 further comprises a power transmitter controller 205 which is arranged to control the operation of the power transmitter 101 in accordance with the desired operating principles. Specifically, the power transmitter 101 may include many of the functionalities required to perform power control in accordance with the Qi Specification.

The power transmitter controller 205 is in particular arranged to control the generation of the drive signal by the driver 201, and it can specifically control the power level of the drive signal, and accordingly the level of the generated power transfer signal. The power transmitter controller 205 comprises a power loop controller controlling a power level of the power transfer signal in response to the power control messages received from the power receiver 105 during the power transfer phase.

Figure 5:
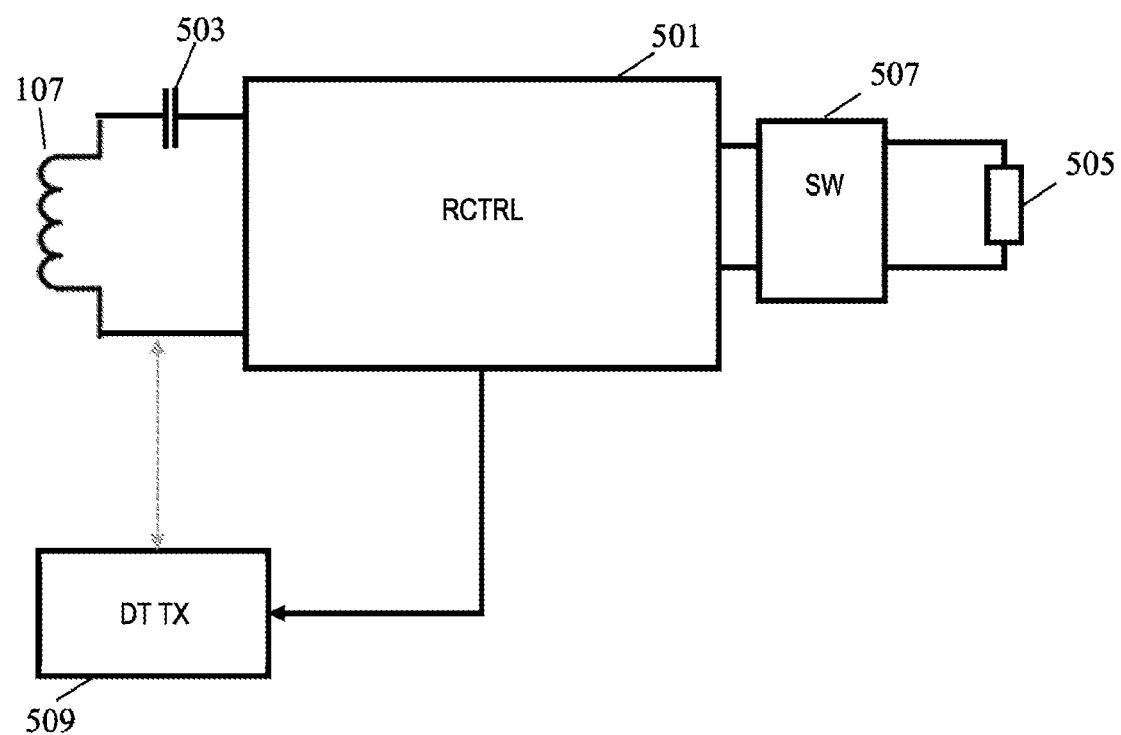
FIG. 5 illustrates an example of elements of a power receiver in accordance with some embodiments of the invention.

FIG. 5 illustrates some exemplary elements of the power receiver 105.

In the example, the receiver coil 107 is coupled to a power receiver controller 501 via a capacitor 503 which together with the receiver coil 107 forms an input resonance circuit. Thus, the power transfer may be a resonant power transfer between resonance circuits. In other embodiments, only one, or none, of the power receiver and the power transmitter may utilize a resonance circuit for power transfer.

The power receiver controller 501 couples the receiver coil 107 to a load 505 via a switch 507. The power receiver controller 501 includes a power control path which converts the power extracted by the receiver coil 107 into a suitable supply for the load 505. In some embodiments, the power receiver controller 501 may provide a direct power path which simply connects the input resonance circuit to the switch 507 or load 505, i.e. the power path of the power receiver controller 501 may simply be implemented by two wires. In other embodiments, the power path may include e.g. rectifiers and possibly smoothing capacitors to provide a DC voltage. In yet other embodiments, the power path may include more complex functions, such as e.g. voltage control circuitry, impedance matching circuitry, current control circuitry etc. Similarly, it will be appreciated that the switch 507 may only be present in some embodiments and that in some embodiments the load 505 may permanently be coupled to the input resonance circuit.

In addition, the power receiver controller 501 may include various power receiver controller functionality required to perform power transfer, and in particular functions required to perform power transfer in accordance with the Qi Specifications.

The power receiver 105 is arranged to transmit data to the power transmitter 101. Such data may specifically include power control loop error messages used to implement a feedback power loop for controlling the power level of the power transfer signal during power transfer as will be known to the skilled person. The power receiver may in many embodiments be capable of transmitting a range of different messages serving different purposes as known to the skilled person. For example, a range of different messages such as those specified in the Qi Specifications may be transmitted. Messages may comprise one or more data bits/symbols.

The power receiver is arranged to transmit messages to the power transmitter using load modulation.

As will be well known to the skilled person, for load modulation, changes in the loading of the power transfer signal may be introduced by the power receiver where the changes are in accordance with data values to be transmitted. These changes can then be detected by the power transmitter in order to decode the data from the power receiver.

Load modulation may be used as the method for the power receiver to communicate control messages, or other data, to the power transmitter in accordance with e.g. the Qi wireless power standard.

There are typically two main ways of performing load modulation, namely either to directly change the resistive load/power extraction of the input circuit and/or to detune the resonance of the input circuit e.g. by changing a reactive loading of the input circuit (typically switching a capacitor in/out in line with data to be transmitted). Similar approaches may be used by the power receiver for load modulating the power transfer signal.

Correspondingly, at the power transmitter, detection approaches such as those known for Qi Specification systems may be used to detect the load variations. For example, a direct measurement of a power level or current amplitude of the drive signal may be used as indications of the loading, and thus load modulation variations introduced by the power receiver as will be known to the skilled person.

The power receiver 105 comprises a data transmitter 509 which is arranged to transmit data to the power transmitter 101 by load modulating the power transfer signal. For example, the data transmitter 509 may be arranged to switch in/out a communication capacitor e.g. positioned in parallel with the power receiver controller 501 or with the resonance capacitor 503 thereby being able to vary the resonance frequency and the loading of the power transfer signal.

The data transmitter 509 may be coupled to the power receiver controller 501 and may be arranged to receive data from the power receiver controller 501 for transmission to the power transmitter.

For example, the data transmitter 509 may receive power error control data from the power receiver controller 501 and may transmit corresponding power error control messages to the power transmitter 101 using load modulation. In operation, the system is typically arranged to control the drive signal such that the power transfer signal attains suitable operating parameters/properties and such that the power transfer operates at a suitable operating point. In order to do so, the power transmitter is arranged to control a parameter of the drive signal using a power control loop where a power property of the power transfer signal/drive signal is controlled in response to power control error messages that are received from the power receiver.

The data transmitter 509 is arranged to transmit data symbols by load modulating the power transfer signal by a sequence of modulation load values corresponding to a chip sequence.

In the approach, load modulation is employed, but each symbol is represented by a chip sequence comprising a plurality of chips, and typically with a sequence comprising 10 to 1023 chips. Thus, rather than simply varying the load in accordance with each symbol or bit, the data transmitter 509 is arranged to transmit a given symbol (typically a bit) by a series of load changes and variations where the changes and variations are different for each symbol. Specifically, a chip sequence may be defined for each symbol and when transmitting a given symbol, the data transmitter 509 may retrieve the chip sequence for that specific symbol and proceed to load modulate the power transfer signal in accordance with the chip sequence for the symbol.

Similarly, as will be described in more detail later, the power transmitter may detect the load modulation by considering the whole chip sequence, and specifically may seek to determine the received symbol as the one for which the measured load variation chip pattern most closely matches the chip sequence pattern for that symbol.

Such an approach may in particular allow the modulation depth, i.e. the magnitude of the load variations to be reduced substantially which may for example reduce electromagnetic noise and interference, may reduce acoustic noise, and may reduce spurious oscillations. It may also in many embodiments result in improved signal to noise ratios and may result in a substantially improved and often more reliable communication with e.g. often a lower bit error rate. Thus, a general overall improved power transfer can be achieved.

Figure 6:
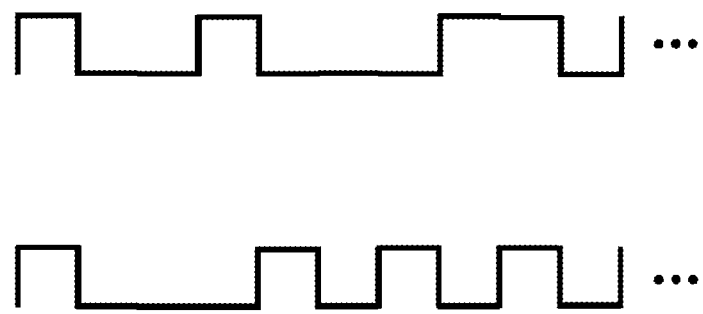
FIG. 6 illustrates an example of chip sequences.

FIG. 6 illustrates an example of parts of two possible chip sequences. Each chip sequence comprises a sequence of chips. Typically, the set of chip values is two, corresponding to a binary chip sequence. A symbol time is thus divided into a plurality of chip intervals with the chip sequences of the chips being different for different data symbols. Typically, each sequence includes at least ten chips, and often substantially more. In many embodiments, each chip sequence may have a length of 2-1 where N is an integer of typically no less than 4.

Each of the stored chip sequences is assigned to one symbol. Thus, each possible data symbol value that may need to be transmitted to the power transmitter may have a linked/associated chip sequence. For example, where only two data symbols are possible, i.e. where a binary communication is implemented, the set of chip sequences may comprise only two chip sequences.

When the power receiver is about to transmit a data symbol, the value is fed to the data transmitter 509 from the power receiver controller 501 which proceeds to determine the chip sequence that is linked to the data symbol value to be transmitted.

The data transmitter 509 is arranged to modulate the chip sequence onto the power transfer signal. Specifically, a modulation load may be switched in and out (on/off) in line with the chips, i.e. the load may be changed in accordance with the modulation load values of the chip sequence. A modulation load may be the part of the loading of the power transfer signal which is due to the (load) modulation. A modulation load may be the part of the loading of the power transfer signal which is varied/variable due to the (load) modulation. In many scenarios, there may be other variations of the loading of the power transfer signal, including both intended variations (e.g. variations in the extracted power for the end load) and unintended variations (e.g. changes in position of metal (e.g. of the power receiver) in the proximity of the power transmitter).

The chip sequence is selected from a set of chip sequences, and in the example the data transmitter 509 stores such a set of chip sequences with each chip sequence being linked to a data symbol value. Typically, the set of chip sequences comprises a chip sequence for each possible data symbol value. For example, if binary communication is used, the first set of chip sequences may comprise only two chip sequences. It will be appreciated that the data transmitter 509 may store the chip sequences in any suitable form and does not need to store a full sequence for each possible data symbol. For example, one or more chip sequences may be represented by a relationship to another chip sequence. For example, for binary communication, the data transmitter 509 may only store a single chip sequence corresponding to one of the binary data values. The chip sequence for the other binary data value may be represented by the same stored bit sequence as it may be given as the inverse of the stored bit sequence. Thus, often the set of chip sequences utilizes complementary inverse chip sequences for pairs of data symbols and therefore only half of the used chip sequences are typically explicitly stored in the data transmitter 509 with the remaining chip sequences being automatically and implicitly stored as the inverse of these.

The chip sequences in the set are typically of the same length.

Load modulation may provide advantageous operation in many systems and applications and tends to provide reliable and low complexity operation suitable for power transfer systems where a power transfer signal is generated for the purpose of transferring power. The reuse of the power transfer signal as a communication carrier may typically reduce complexity and require less circuitry thereby reducing cost. The Qi Specifications were originally implemented with unilateral communication from the power receiver to the power transmitter by using a load modulation with a modulation symbol shape that allowed easy differentiation between binary data values.

However, load modulation as used in e.g. Qi systems may also have some associated disadvantages. Such disadvantages may e.g. be related to issues such as electromagnetic compatibility, communication quality (bit error rate), and audible noise.

The load modulation may create additional components in the electromagnetic spectrum causing additional electromagnetic interference and electrical noise. Also, it has been found that in many cases, the changes to the electromagnetic field caused by the load modulation may cause mechanical forces and movement that result in audible noise. It has also been found that strong load modulation may disturb the energy balance in the wireless power system, resulting in spurious oscillations within the communication carrier spectrum. In the presence of spurious oscillations, the wireless power transmitter often cannot properly demodulate the signal and therefore it has to interrupt power delivery to maintain safe operations.

The problems tend to be exacerbated for higher power transfer levels. Indeed, as the power levels of the power transfer signal increase, it is typically required that the load change for load modulation increases as well. Typically, the load modulation is required to be a suitable fraction of the power level, or maximum power level, of the power transfer signal. For example, the load modulation caused by the load modulation may be required to have a magnitude of no less than e.g. about 1% of the general loading of the power receiver (i.e. the load variation for the receiver coil caused by the load modulation may be required to be no less than 1% of the total load of the receiver coil 107). Qi was originally introduced for lower power applications of less than 5 W or so. For such lower power levels, the impact of the load modulation disadvantages is relatively manageable or even substantially insignificant. However, the maximum power levels for Qi have been increased to currently a maximum value of 15 W and work is ongoing to increase this further to a maximum level of 45 W. However, for such power levels, the above mentioned disadvantages tend to be significant, and they may provide a major obstacle to the further development of the Qi Specifications.

The system of FIGS. 1, 2, and 5 may utilize an approach which in many situations may address one or more of the issues associated with load modulation. Load modulation is employed, but each symbol is represented by a chip sequence comprising a plurality of chips, and typically with a sequence comprising 15 to 127 chips. Thus, rather than simply varying the load in accordance with each symbol or bit, the data transmitter 509 is arranged to transmit a given symbol (typically bit) by a series of load changes and variations where the changes and variations are different for each symbol. Specifically, a chip sequence may be defined for each symbol and when transmitting a given symbol, the data transmitter 509 may retrieve the chip sequence for that specific symbol and proceed to load modulate the power transfer signal in accordance with the chip sequence for the symbol.

The power transmitter may detect the load modulation by considering the whole sequence, and specifically the power transmitter may seek to determine the received symbol as the one for which a detected load variation pattern most closely matches the chip sequence pattern for that symbol.

Such an approach may in particular allow the modulation depth, i.e. the magnitude of the load variations to be reduced substantially which may for example reduce electromagnetic noise and interference, may reduce acoustic noise, and may reduce spurious oscillations. It may also in many embodiments result in improved signal to noise ratios and may result in a substantially improved and often more reliable communication with e.g. often a lower bit error rate. Thus, a general overall improved power transfer can be achieved.

In many embodiments, binary communication may be used where only two data symbol values are possible (corresponding to a "0" bit value or a "1" bit value). In such cases, one bit value may be represented by a given chip sequence and the other bit value may be associated with the inverse bit sequence, i.e. the bit sequence that results from changing each chip value to the opposite value. The two bit sequences are thus typically complementary with one resulting from the other by multiplication by −1 (with the chip values being represented by +1 and −1).

A particular advantage in such a case is that demodulation is particularly easy as a single correlation can be used to differentiate between the bit values as the magnitude of the correlation is the same for the chip sequences, but the signs of the correlation values are opposite.

The following description will focus on such binary communication, but it will be appreciated that the invention is not limited only to binary communication.

Thus, the data transmitter 509 may be arranged to receive data symbols, typically from the power receiver controller 501, to be transmitted to the power transmitter, it may proceed to determine a corresponding chip sequence and load modulate the power transfer signal by this chip sequence. Typically, the data symbols are binary but in some cases higher order modulation symbols may be used (i.e. with more than two possible values). In some cases, such higher order data symbols may correspond to a combination of received data bits. For example, two bits may be combined into a single quaternary data symbol. Such combination may be possible both when the data bits are related and when they are e.g. completely independent.

Longer chip sequences may provide improved noise suppression etc. but may also reduce the data rate as the symbol time increases for a given chip rate. Increased chip sequence lengths also increase complexity and resource demand, especially at the receiver where correlation with longer sequences may substantially require the number of computations required. A typical suitable value is N=5 and this a chip length of 31 chips.

Each of the chip sequences is assigned to a data symbol. Thus, each possible data symbol value that may need to be transmitted to the power transmitter may have a linked/associated chip sequence. For example, where only two data symbols are possible, i.e. where a binary communication is implemented, the set of chip sequences may comprise only two chip sequences. In this case, the chip sequences may as previously mentioned be the inverse of each other, and specifically one may arise from multiplication of the other by −1.

It is feasible that the first set of chip sequences may include more than one chip sequence for a given data symbol, i.e. it is possible that multiple sequences are linked to the same data symbol (for example with the chip sequences having different lengths). However, typically each chip sequence will be linked to one data symbol, and one data symbol will be linked with only one chip sequence of the first set of chip sequences.

It will be appreciated that such a binary approach with two inverse chip sequences being used is equivalent to considering that the two possible binary values are modulated by the same chip sequence but with the data symbols having opposite data values (e.g. +1 and −1).

The power transmitter 101 of FIG. 2 comprises a receiver 207 which is arranged to receive the load modulation data symbols transmitted by the power receiver 105 using load modulation of the power transfer signal.

The receiver 207 comprises a load measurer 209 which is arranged to measure a load of the power transfer signal to determine measured load values for the power transfer signal. The measured load values may be indicative of a loading of the power transfer signal by the power receiver, and thus may be indicative of the modulation load applied to the power transfer signal by the power receiver 105.

The load measurer 209 is coupled to a chip determiner circuit 211 which is arranged to determine a received chip sequence from the measured load values. The received chip sequence may specifically be a sequence of binary chip values corresponding to the estimated chip values derived from the load measurements. The received chip sequence may in some embodiments be soft decision values indicative of not only a chip data value but also of a confidence of this chip data value. The received chip sequence is thus determined from the load variations determined by measuring a load of the power transfer signal.

The chip determiner circuit 211 is coupled to a detector 213 to which the received chip sequence is fed. The detector 213 is coupled to a store 215 which stores a set of chip sequences that specifically correspond to the chip sequences stored and used by the data transmitter 509 of the power receiver. Thus, the store 215 stores the chip sequences of the set of chip sequences, and the power receiver and the power transmitter accordingly store local replicas of the same chip sequences and with these linked to the same data symbols The power transmitter 101 comprises a local representation of the chip sequences used by the power receiver. The power receiver and the power transmitter have stored corresponding links between reference chip sequences and data symbols.

In the example, the store 215 may store only a single data symbol chip sequence, namely that used to modulate the binary data symbols (and thus with the single stored data symbol chip sequence being equal to the chip sequence representing one binary data value and the inverse (typically sign inverted) chip sequence representing the other binary data value).

The detector 213 is arranged to determine data symbols received from the power receiver in response to a correlation of the stored chip sequences (of the set of chip sequences) and the received chip sequence. Specifically, in some embodiments, the load detector 213 may correlate the determined received chip sequence provided by the detector 213 with all the stored data symbol chip sequences of the set of chip sequences to determine a correlation value for each. In cases, such as the described binary case where some sequences are the inverse of each other, only one correlation may be performed with the sign of the correlation value reflecting the correlation with two possible chip sequences.

Thus, the detector 213 may correlate the received chip sequence with the reference chip sequence(s) to determine a correlation value indicating how closely these match.

The detector 213 may then determine the data symbol as one linked with the chip sequence for which the associated correlation value is sufficiently high for a given threshold to be exceeded. The threshold may in many embodiments be an adaptive threshold, for example the threshold may be set dependent on correlation values with other symbols. As a specific example, the threshold may be set as the value of the next highest correlation value (e.g. subject to a minimum threshold value) resulting in the data symbol being selected as the one for which the correlation value is highest (e.g. subject to it exceeding the minimum threshold value).

Thus, the power receiver is capable of transmitting data to the power transmitter using load modulation with relatively long chip sequences for each data symbol, and the power transmitter may be arranged to receive this communication. The approach may provide a substantially improved communication and operation in many embodiments. In particular, a substantially improved communication performance and reliability, and especially the symbol signal to noise ratio may be increased substantially. This may allow the modulation depth, and specifically the modulation load variations relative to the power transfer signal level/power transfer level, to be reduced substantially. Indeed, in many cases, the modulation depth may be reduced by a factor of 10, 100, or even higher. This may reduce and mitigate many of the disadvantages of using load modulation and may e.g. reduce electromagnetic interference, reduce electrical noise, reduce mechanical noise, prevent or mitigate spurious oscillations etc.

For example, using a chip rate corresponding to the bit rate used in Qi, which may be up to 2 KBps communication rate, the improvement in signal to noise ratio may be increased by an amount corresponding to the sequence length. For example, using bit lengths of 63 or 127 may increase the symbol energy to noise ratio by a corresponding amount allowing the modulation depth to correspondingly be reduced by a factor of 63 or 127 while maintaining the same bit error rate.

A disadvantage of such an approach may be that the effective communication rate may be reduced. For example, the use of sequence lengths of 63 or 127 may reduce the effective baud rate to 30.7 or 15.7 bps, respectively. In order to address this, the chip time interval duration may be reduced. The reduction may be a suitable trade-off between desired communication rate and bit error performance and can be selected for the specific application and implementation. Increasing the chip rate may have the effect that the required bandwidth and frequency spectrum of the load modulation may increase correspondingly, and potentially by a high amount. However, it is a particular advantage of the current approach that communication in a wireless power transfer system is typically not bandwidth restricted or even sensitive to the bandwidth of the communication and thus such an additional bandwidth may typically be available without impacting other functionality or performance.

However, whereas the described approach may provide preferable operation and performance in many scenarios and embodiments, it also provides some challenges. One challenge is that of how to accurately detect the chip values at the power transmitter. Typically, the load variations caused by load modulation are relatively small which makes it difficult to detect the chip values accurately.

An approach that may be used to detect the chip values is to compare the measured load values to a threshold. For example, the load measurer 209 may be arranged to measure the load once per chip value, i.e. the load measurement values may be load measurement samples generated with one sample per chip.

For example, the load value of the drive signal (e.g. the current and/or power) may be measured and sampled at time intervals corresponding to the chip intervals during a time when a message is (expected to be) received from the power receiver. Thus, a received chip sequence is generated from the sampling of the signal(s) of the output circuit.

However, as the specific operating conditions tend to vary substantially, a fixed, predetermined threshold is typically not feasible. Rather, a suitable threshold may be determined based on the signal conditions and in particular a threshold may be derived to correspond to the average modulation load level.

Figure 7:
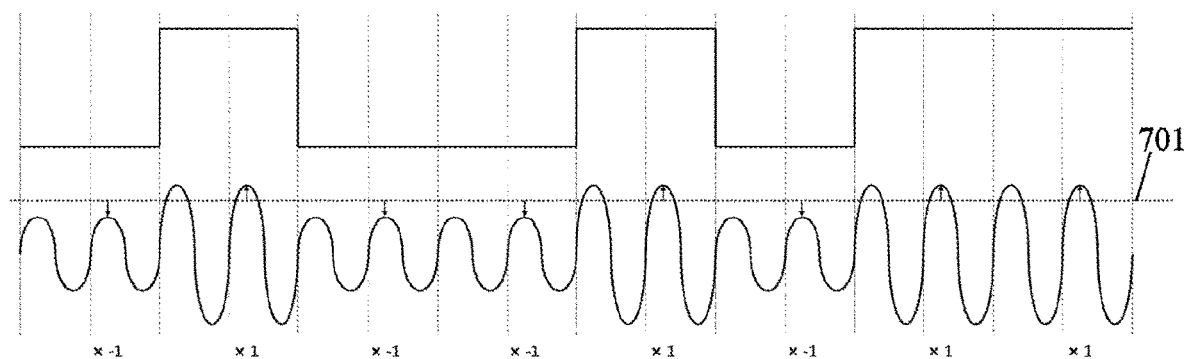
FIG. 7 illustrates an example of a load communication in a wireless power transfer system.

FIG. 7 illustrates an example of how a power transfer signal could be load modulated by chips of a chip sequence. In this example, the modulation is synchronized to the power transfer signal at a rate of one chip per two power signal cycles. The arrows in FIG. 7 indicate times for which the load of the power transfer signal is measured/sampled. The sampling is synchronized with the power transfer signal and one sample is generated for each chip.

In order to determine the (binary) chip value, the sampled load values are compared to an average level 701. In the specific example, the load of the power transfer signal is determined as the peak cycle value of the measured signal (which specifically may be a current, voltage, phase, or power of the power transfer signal), and the sampling is synchronized with the peak of the power transfer signal. Further, the average level 701 of the peak cycle values is first determined, and the chip values then are determined based on whether the measured sample value is above or below the average level 701.

However, whereas such an approach may provide a very useful communication link in many situations, it may in some cases be sensitive to noise, errors, etc and it may sometimes result in a bit error rate which is higher than preferred. Specifically, for the approach described with reference to FIG. 7, it is important to determine the average level with great accuracy. Deviations and errors may have a significant impact not only on the individual chip values, but also on the correlation result used to determine the data symbol itself. It may result in substantially reduced peak values, strong sidelobes to the peaks, or even in peaks with opposite signs, etc. It may accordingly result in substantial bit errors.

Figure 8:
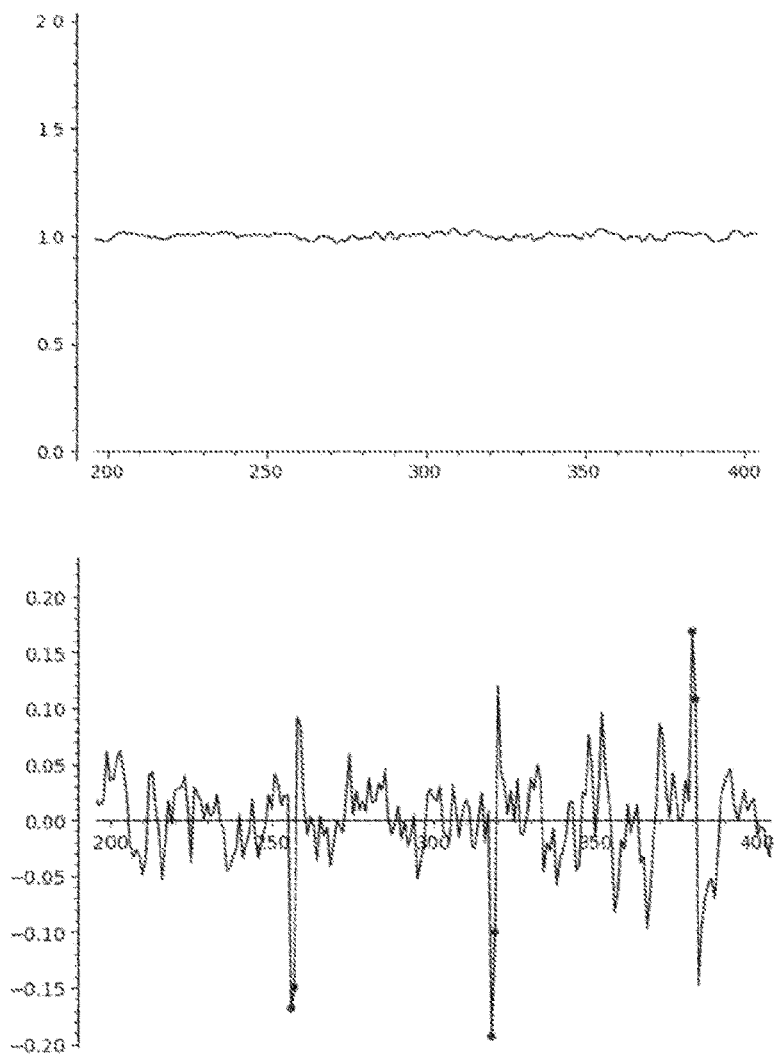
FIG. 8 illustrates an example of simulation results for load modulation communication in a wireless power transfer system.

FIG. 8 illustrates an example of the result of simulations of such an approach. The upper chart shows the sampled signal (sampled peak values of the power transfer signal for an example of three data symbols (two "0" and one "1") modulated on to the power transfer signal using $5^{th}$ order chip sequences. The lower chart shows the output of the correlation to a chip sequence for using a simple exponential moving average (EMA) filter to determine the average level. One can clearly observe the strong sidelobes, having opposite signs to the main correlation peaks thereby potentially leading to bit errors. The presence or absence of such sidelobes strongly depends on the EMA filtering parameter, with the artefacts becoming more pronounced if the weight of the past samples in the filtering is reduced.

However, the system of FIGS. 1, 2, 5 use a different approach, and specifically an approach that may typically provide improved performance and/or facilitated operation.

Rather than requiring the determination of an accurate average level, the approach effectively embeds the reference level into the modulation format itself.

In the approach, each chip is divided into two (or more) load time intervals that have different modulation loads. Thus, each chip may comprise at least two load time intervals with different modulation loads and thus each chip is represented by at least two different modulation loads, and specifically each chip is represented by a pattern of load modulation loads that are different for at least two load time intervals. Further, the pattern of different modulation loads is specific to a given chip value. Thus, different chip values are linked to different patterns of load modulation.

In the approach, each chip of a chip sequence has a duration divided into a plurality of time intervals (also referred to as load time intervals), such as in many embodiments two time intervals. The modulation load (value) changes between consecutive time intervals, and thus the modulation load (value) is different for different time intervals. The modulation load (value) may be constant within each load time interval. In many cases, the time intervals can be considered to be defined by the times at which the modulation load changes. The duration of a chip accordingly extends across a time of at least two different modulation load (values). Rather, than a chip duration corresponding to a single constant modulation load value, it extends over at least two different modulation load values. Thus, rather than a constant modulation load, a modulation load pattern is present in each chip duration. The modulation load pattern depends on the chip value, and different chip values are linked with different modulation load patterns.

Each chip of a chip sequence may be represented by a modulation load pattern, different chip values being represented by different modulation load patterns, and each modulation load pattern being formed by a sequence of load time intervals, a modulation load value being constant within each load time interval and changing between different/consecutive time intervals.

In many embodiments, the system may use binary modulation loads, i.e. the modulation load applied by the power receiver may have one of two possible load values. Such an approach is advantageous by allowing a low complexity implementation and facilitated operation. It typically facilitates the load modulation operations for both transmitting and receiving functions and tends to lead to efficient performance and reliable communication.

As an example, the data transmitter 509 may typically control the switching in or out of a modulation load component, such as a capacitor or resistor, and thus may apply to different modulation loads.

In many embodiments, a binary load modulation may thus be used. Further, in many embodiments, the chip time interval may be divided into two load time intervals with one binary load value being applied in one load time interval and the other load value being applied in the other load time interval. Two binary chip values can then be determined to correspond to the two possible patterns/orders of the two modulation loads being allocated to the two load time intervals. Specifically, in some embodiments, each transmitted chip may be divided into two halves with opposite modulation loads in each of those halves, and with the order of these (i.e. which modulation load is allocated to the first half) depending on the binary chip value.

Figure 9:
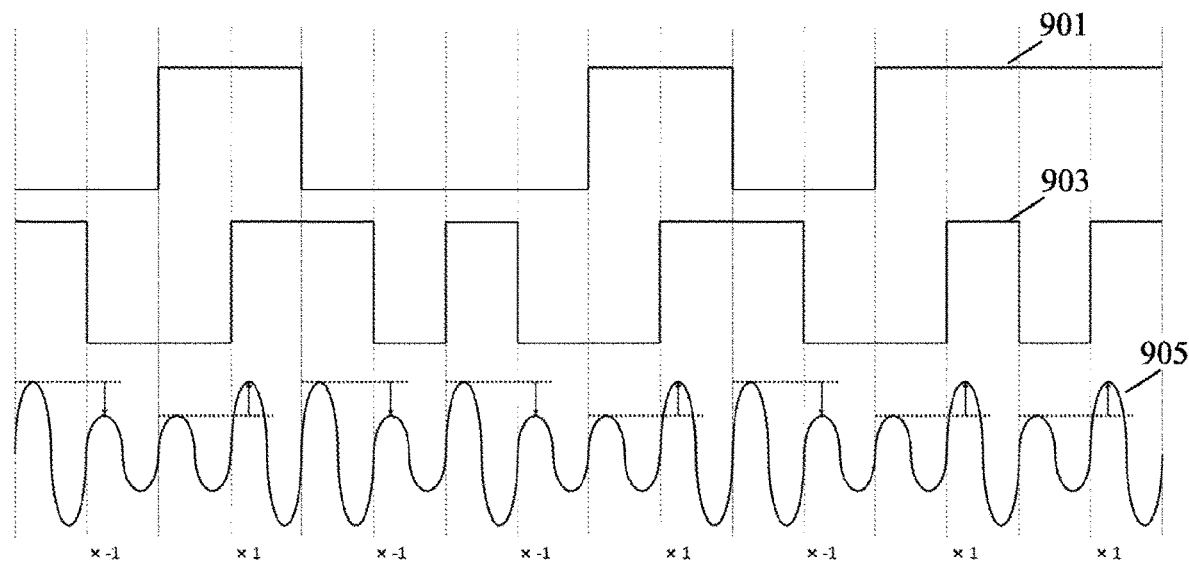
FIG. 9 illustrates an example of a load communication in a wireless power transfer system in accordance with some embodiments of the invention.

An example of this is shown in FIG. 9 in which the top signal 901 illustrates the chip sequence and the middle signal 903 illustrates the modulation load value variation. As illustrated, each chip is divided into two load time intervals with one having a high(er) modulation load and one having a low(er) modulation load. Whether the first load time interval of a given chip is the high(er) or low(er) modulation load depends on the chip value.

Specifically, signal 901 shows the chips in the sequence and signal 903 shows the switching of the modulation load by the data transmitter 509, i.e. it shows modulation load levels in the load time intervals. In the example, the data transmitter 509 switches the modulation load off (or low) in the first half and on (or high) in the second half for a "1" chip. Conversely, for a "0" chip, the data transmitter 509 switches the modulation load on (or high) in the first half and off (or low) in the second half.

In the approach, the power transmitter is arranged to determine the data symbols by considering the relative load variations within the chips. Specifically, the load measurer 209 is arranged to measure the load of the power transfer signal to determine measured load values for the load time intervals. A measured load value/sample may be determined for each load time interval.

The chip determiner circuit 211 is arranged to determine the individual chip value in response to the difference between measured load values for at least two modulation load time intervals of the individual chip.

Specifically, the chip determiner circuit 211 may be arranged to determine the difference between two load time intervals, for example the load value for the first load time interval may be subtracted from the load value for the second load time interval. Depending on the result, the chip determiner circuit 211 may then proceed to determine the chip value as a function of the difference.

In FIG. 9, signal 905 represents the measurements of the drive signal/power transfer signal. As can be seen, each chip comprises a load time interval with a high signal level (corresponding to a low modulation load) and one with a low signal level (corresponding to a high low modulation load), with the order of these depending on the chip value. In the example, an increased signal level (the level for the second load time interval being higher than for the first load time interval) is decoded as a chip value of "1" and a decreased signal level (the level for the first load time interval being higher than for the second load time interval) is decoded as a "0".

The amplitude/level of the drive signal/power transfer signal in the first half of the chip (the first load time interval) can serve as the reference level for the measurements made in the second half of the chip (the second load time interval), or vice versa. The reference for the load modulation determination of the individual chip is thus directly embedded within the modulation format. The determination of the chip values can thus be made without requiring an average or reference level to be estimated or determined. Rather, a local intra-chip relative measurement and comparison can be used to determine the chip values.

The chip values are then used to generate the received chip sequence which is compared with the chip sequences by the detector 213 to determine the data symbol values.

Specifically, load values indicating the received chip sequence may be fed to the correlation of the detector 213 with the load values being the difference between the (peak) values of the drive signal/power transfer signal measured in each of the two halves of the chips. Such a procedure may remove the need to find the average level, and the optimization of any filtering parameters to do so, etc. Another advantage is that the proposed approach is insensitive to slow or even fast variations in the power signal.

Figure 10:
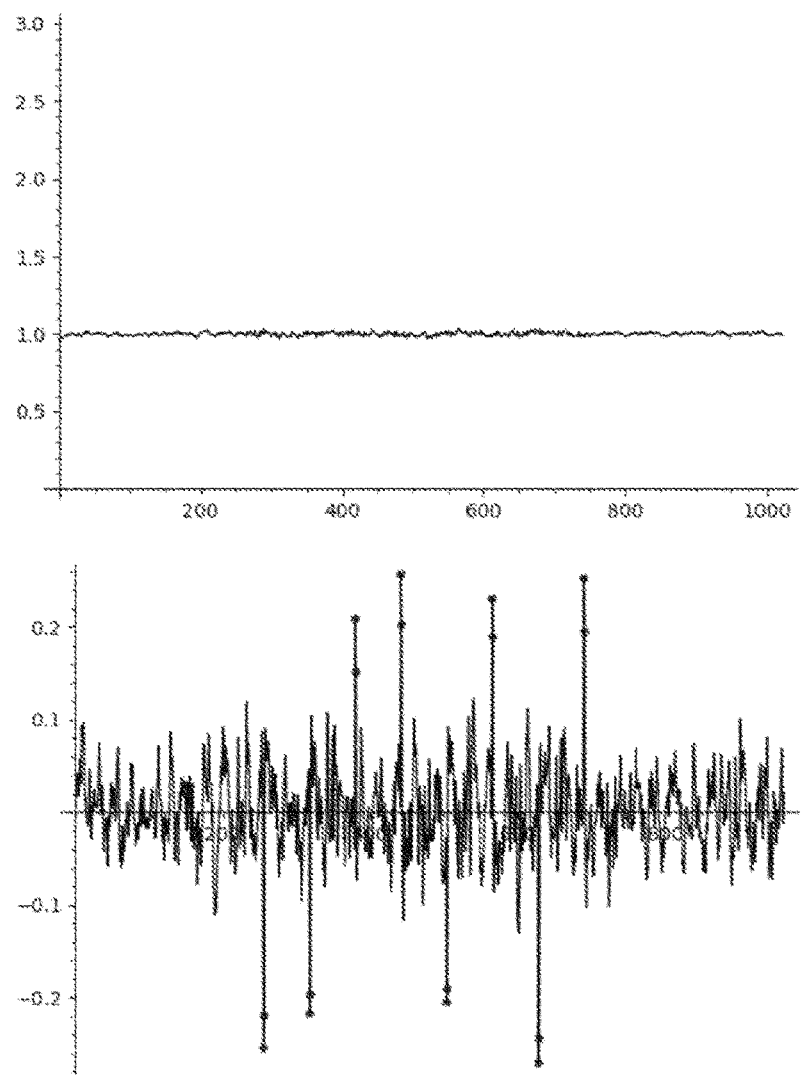
FIG. 10) illustrates an example of simulation results for load modulation communication in a wireless power transfer system.
Figure 11:
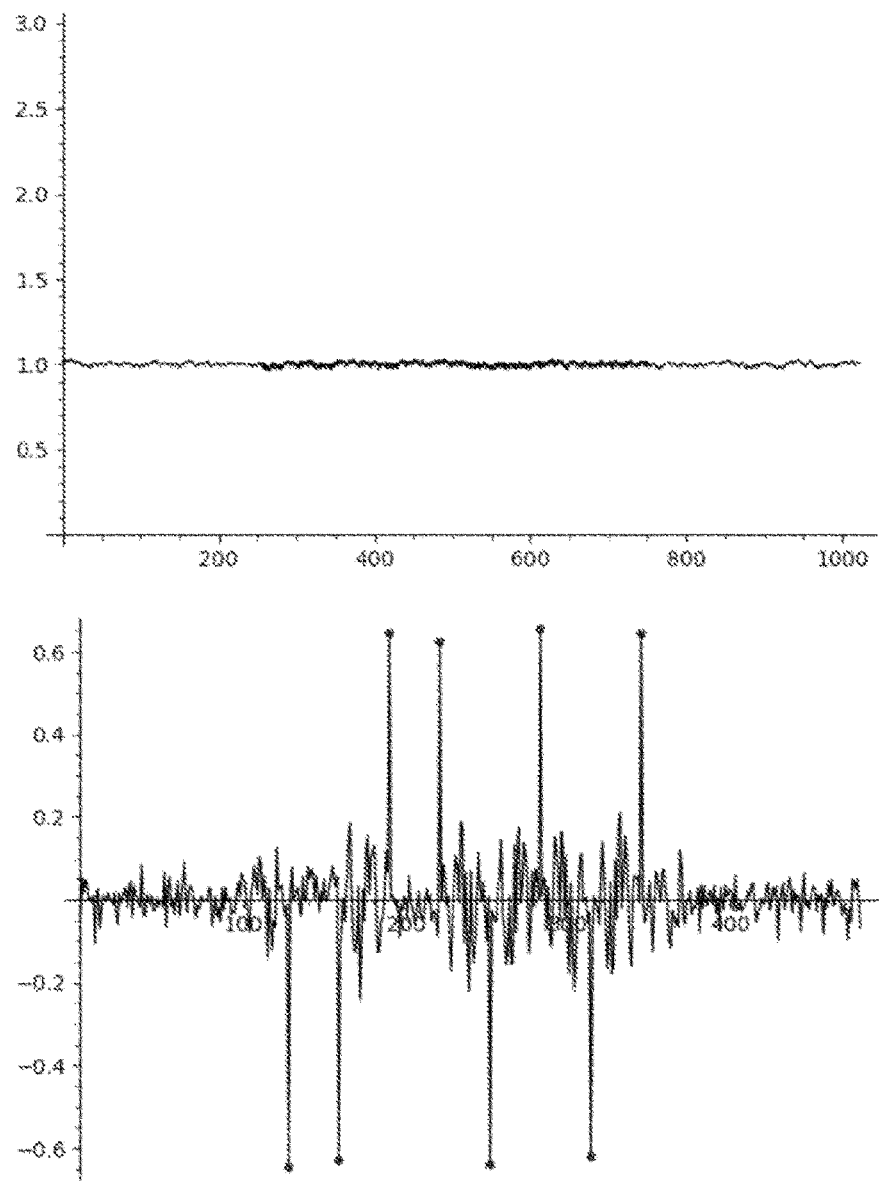
FIG. 11 illustrates an example of simulation results for load modulation communication in a wireless power transfer system in accordance with some embodiments of the invention.

The approach may provide substantially improved performance and more reliable data communication. As an example, FIG. 10 illustrates an example of respectively the power transfer signal variations resulting from load modulation and noise, and the resulting correlation values for an approach in accordance with FIG. 7 (using a simple EMA filter). FIG. 11 shows the corresponding results for an approach in accordance with FIG. 9. As can be seen, the correlation peaks in the latter case clearly stand out substantially more. The embedded data uses a $5^{th}$ order sequence at 1% modulation depth.

Figure 12:
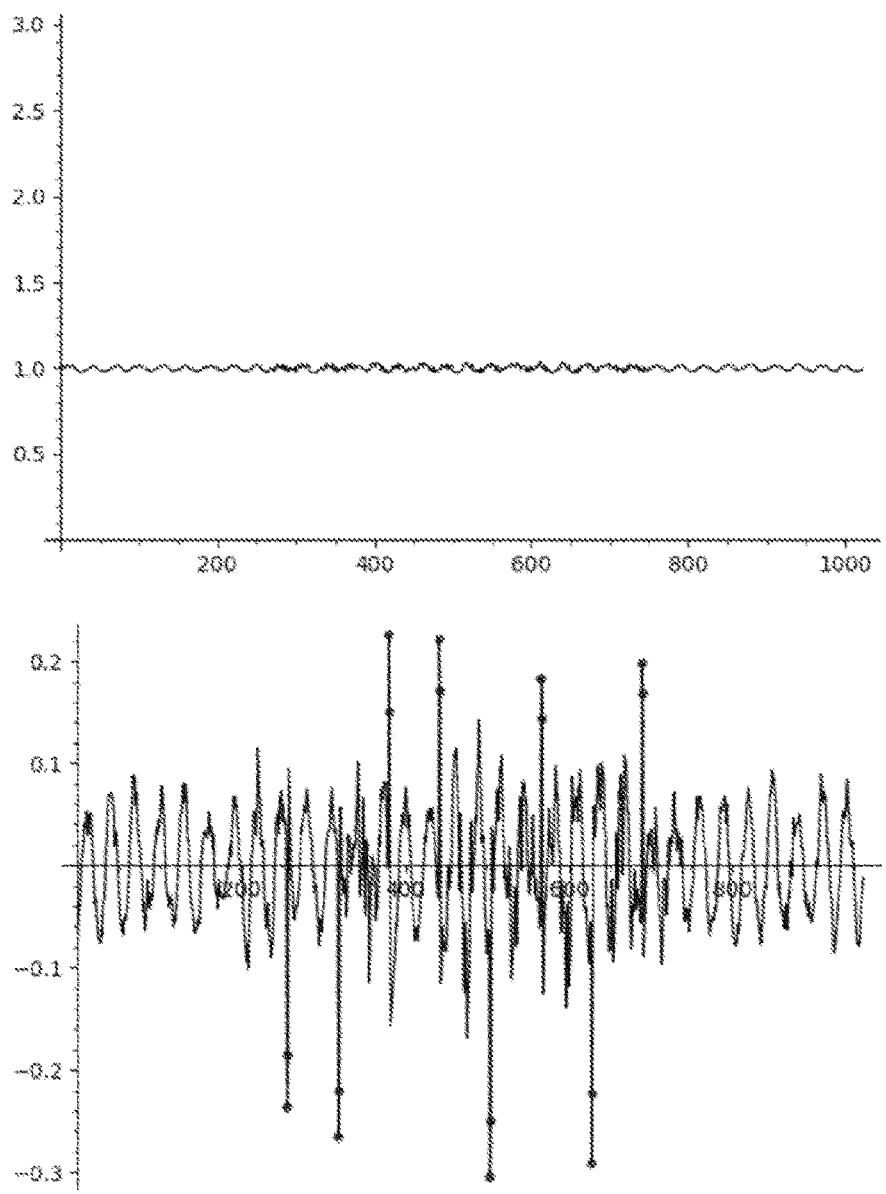
FIG. 12 illustrates an example of simulation results for load modulation communication in a wireless power transfer system.
Figure 13:
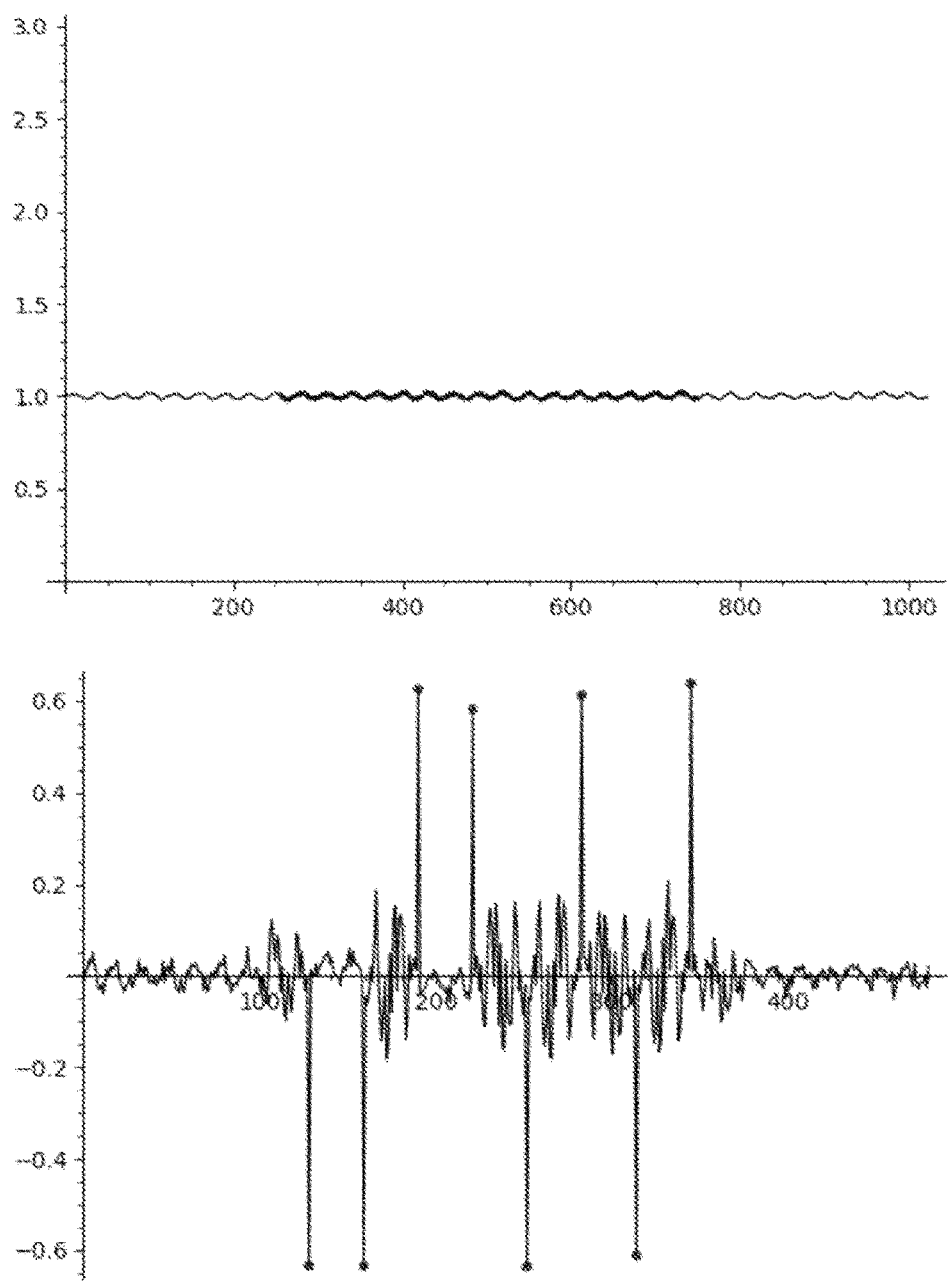
FIG. 13 illustrates an example of simulation results for load modulation communication in a wireless power transfer system in accordance with some embodiments of the invention.

FIGS. 12 and 13 correspond to the examples of FIGS. 10 and 11 respectively but for the case where the power transfer signal is overlaid a small oscillating noise component. The period of the oscillations is about half a bit length. While the approach using the simple EMA filter suffers much from these oscillation components, the performance of the proposed new method is not impacted at all.

Figure 14:
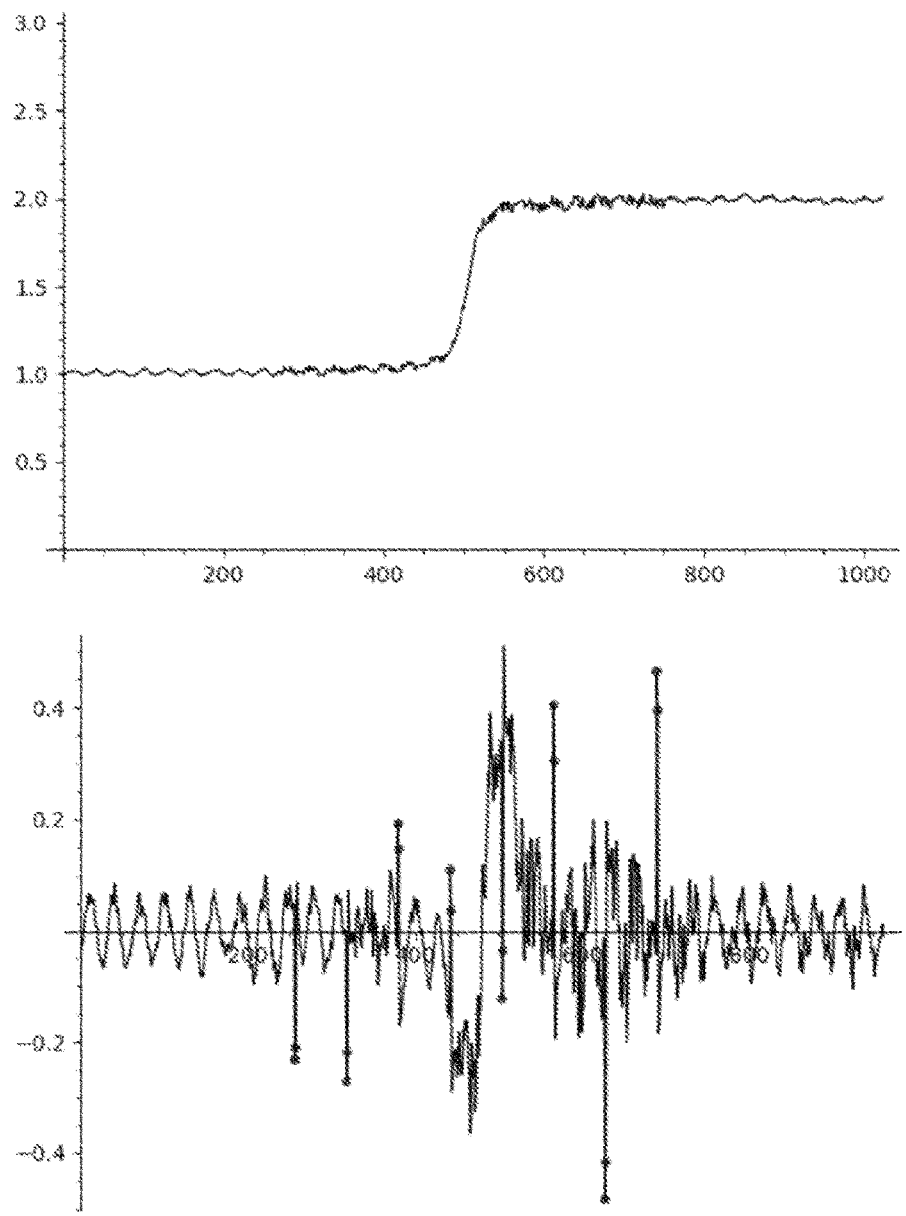
FIG. 14 illustrates an example of simulation results for load modulation communication in a wireless power transfer system.
Figure 15:
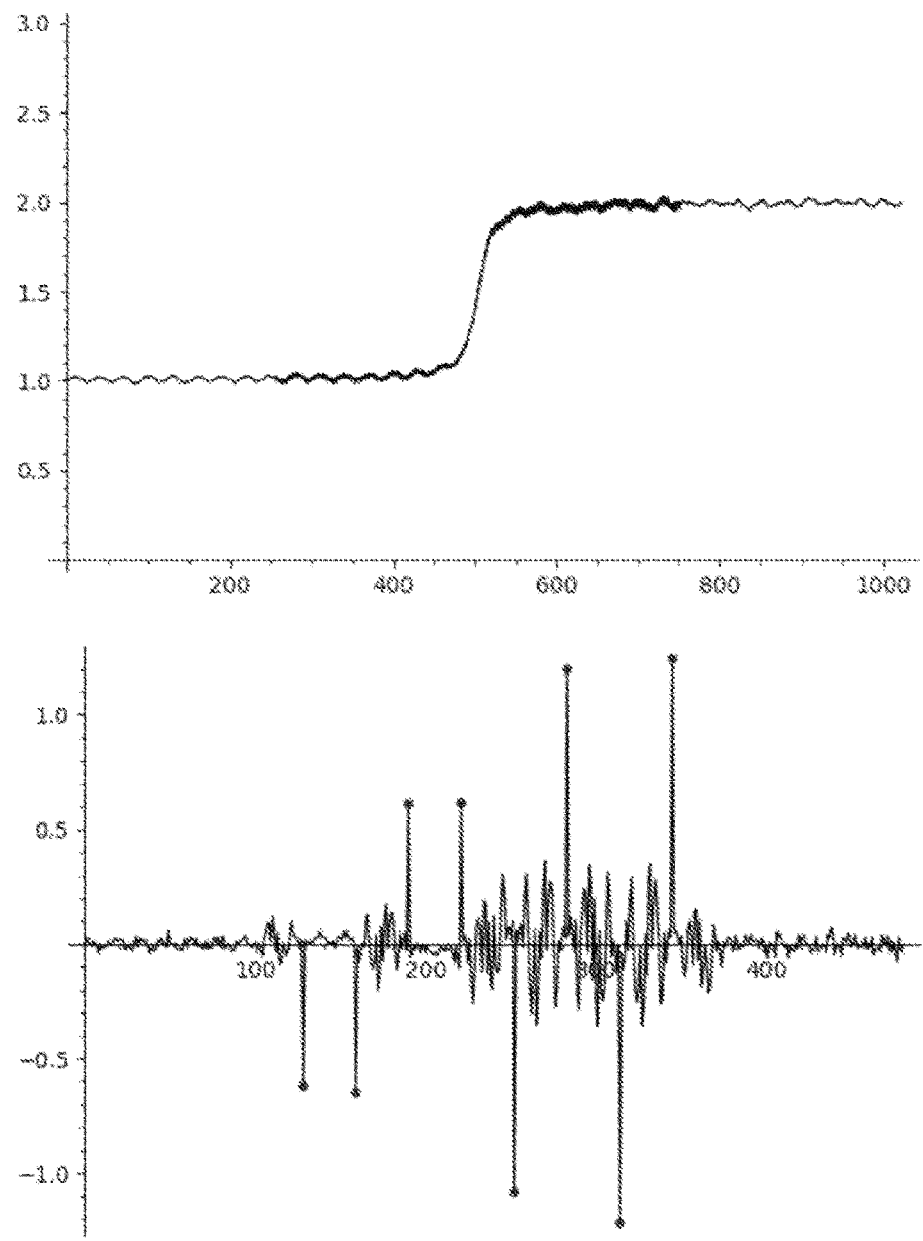
FIG. 15 illustrates an example of simulation results for load modulation communication in a wireless power transfer system in accordance with some embodiments of the invention.

FIGS. 14 and 15 correspond to the examples of FIGS. 10 and 11 respectively but for the case where there is a step in the carrier signal/power transfer signal. Clearly, reliable demodulation is not possible using the simple EMA filtering approach. However, demodulation using the approach of FIG. 9 is hardly impacted, if at all.

Figure 16:
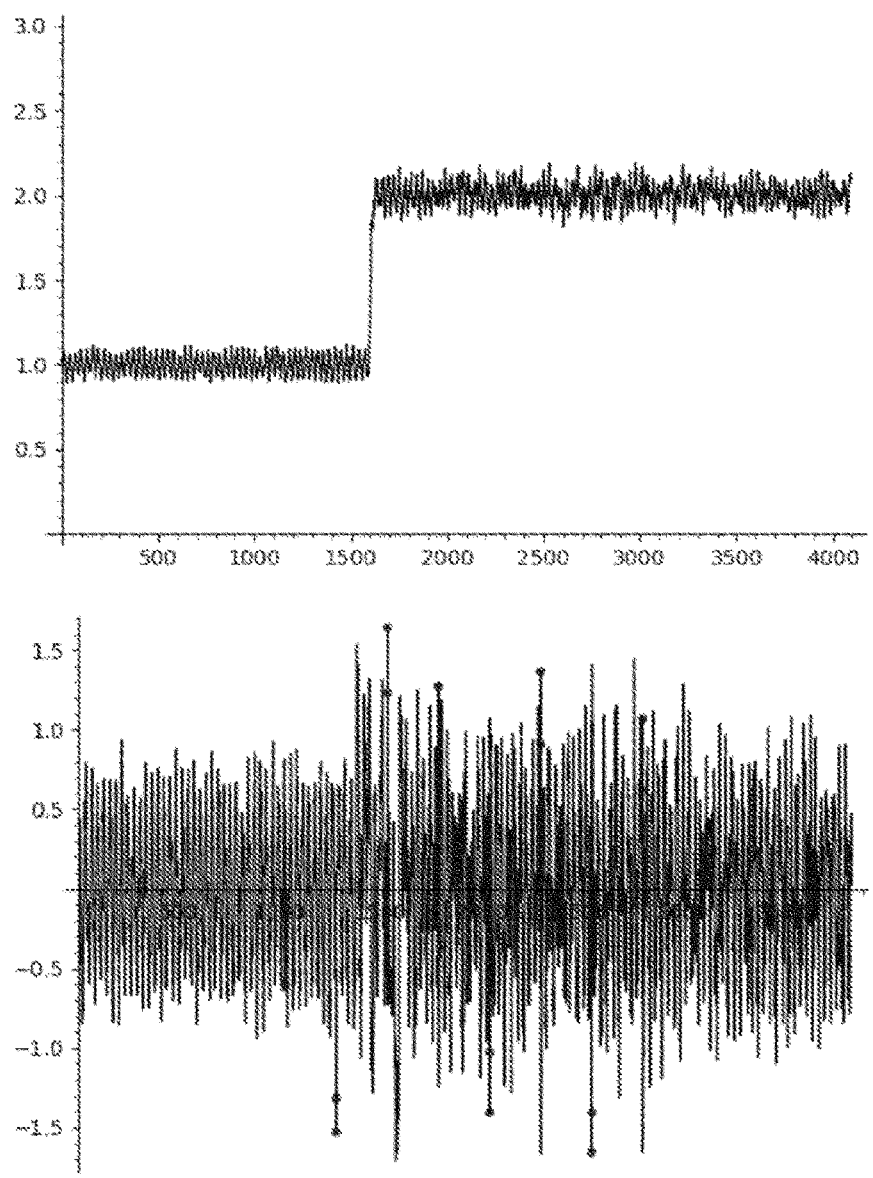
FIG. 16 illustrates an example of simulation results for load modulation communication in a wireless power transfer system.
Figure 17:
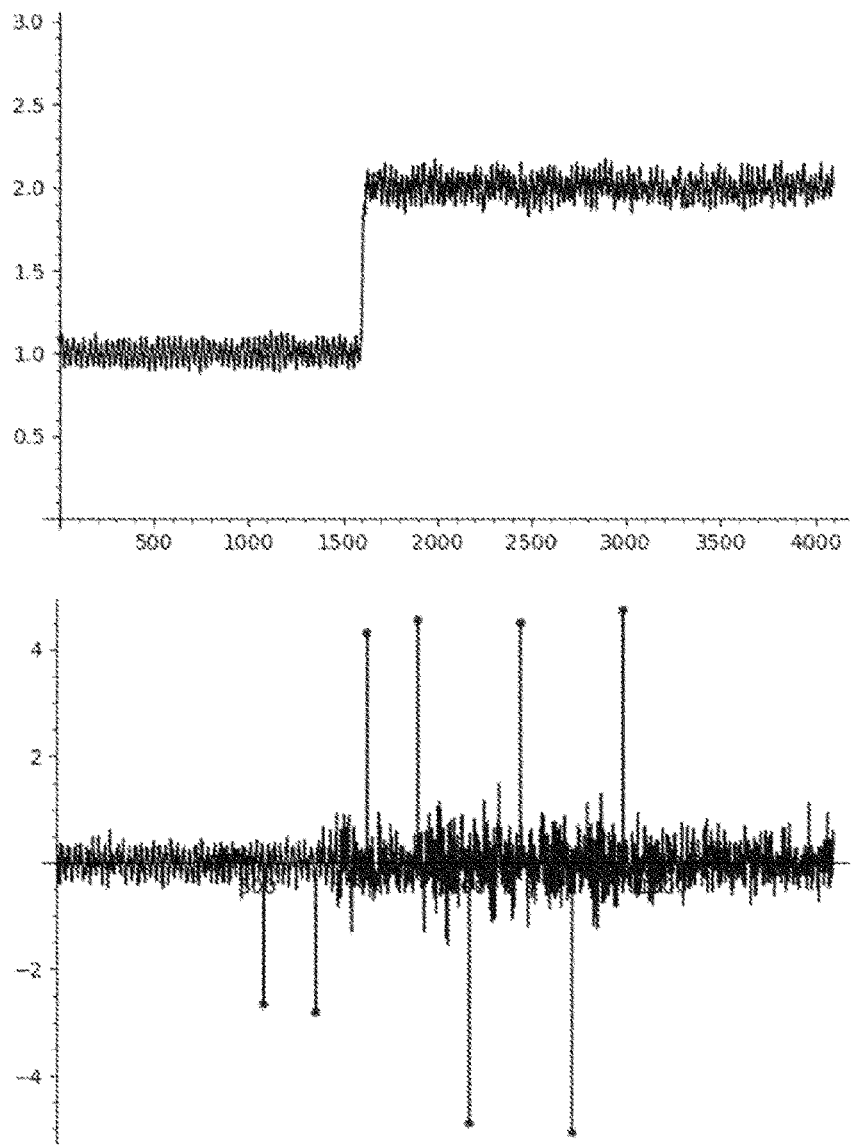
FIG. 17 illustrates an example of simulation results for load modulation communication in a wireless power transfer system in accordance with some embodiments of the invention.

FIGS. 16 and 17 correspond to the examples of FIGS. 10 and 11 respectively but for a situation where the carrier signal/power transfer signal suffers strong noise, strong oscillations and a steep step. The data is embedded using a $7^{th}$ order sequence at 1% modulation depth. Demodulation is not possible using simple EMA filtering. However, using the approach of FIG. 9, demodulation can be achieved with high reliability.

In many embodiments, the chip determiner circuit 211 may be arranged to determine the chip values as binary chip values. The chip determiner circuit 211 may specifically be arranged to select the binary chip value to correspond to the sign of the difference between the load values/measures in the load time intervals of a chip. For example, if the signal peak sample is higher in the first load time interval than in the second load time interval, then the chip value may be determined as a "1" whereas if the if the signal peak sample is lower in the first load time interval than in the second load time interval, then the chip value may be determined as a "0" (or vice versa). In many embodiments, the chip determiner circuit 211 may determine the difference between the load values in the load time intervals and set the binary value to correspond to the sign.

Such an approach may provide a low complexity yet accurate determination of the received chip sequence which is suitable for low complexity correlation. For example, it may allow a binary correlation operation which is substantially lower complexity and resource demanding as multiplications can be replaced by simple binary operations (e.g. a simple binary exor operation).

In some embodiments, the chip determiner circuit 211 may be arranged to determine the received chip sequence to comprise soft-decision chip values. Rather than a simple binary value, the generated chip values may also indicate the reliability or confidence level for the chip value.

For example, the magnitude of the difference may be considered in addition to the sign. For example, a given nominal case with no noise, a nominal magnitude of the difference may be determined (or e.g. the nominal difference may be determined by averaging/low filtering the differences for a plurality, and typically many, chips). The deviation of the difference for a specific chip to this difference may accordingly indicate the probability of the decision being a correct value. However, in most embodiments, the magnitude of the difference may simply indicate the confidence or reliability, and the larger the measured difference, the more likely the sign is to be correct, i.e. the larger the difference magnitude the more confidence in the chip value.

The correlation with the chip sequences of the set of chip sequences may be performed in response to the soft-decision chip values, and specifically the correlation may be performed using the soft decision values.

For example, in some embodiments, the correlation may be performed as a binary exor-operation between stored binary chip sequences and a received chip sequence formed by the signs of the determined differences with the result of each exor operation being weighted (e.g. multiplied) by the magnitude of the difference (possibly relative to a nominal difference) prior to summation of the results. As another example, the stored chip sequences may be represented by chip values of +1 and −1 and these values may directly be multiplied by the corresponding chip load differences (corresponding to the received chip sequence). The correlation may then be determined by summing the multiplication results.

Such approaches may require more complex operations but may in many embodiments and scenarios provide improved performance and specifically may allow more accurate data symbol detection.

As in the examples described above, the chip time intervals may typically be synchronized with the cycles of the power transfer signal. Similarly, the load time intervals may typically be synchronized with the cycles of the power transfer signal. In many embodiments, the system may be arranged to synchronize the load modulation communication (and specifically the chip time intervals and the load time intervals) to the power transfer signal/drive signal.

In many embodiments, the data transmitter 509 may specifically be arranged to synchronize the load modulation of the chip sequence and load time intervals to the power transfer signal. The power transfer signal has an operating frequency which is typically in the range of 10 KHz-500 KHz and for Qi is often around 100 KHz. The data transmitter 509 may adapt the timing of the chip time intervals and the load time intervals to be synchronized to the oscillations and periods of the power transfer signal. For example, in many embodiments, the data transmitter 509 may use a chip duration/time interval and/or a load time interval (duration) which is a multiple of the power transfer signal period. Thus, each load time interval may have a duration that is a multiple of the period time of the power transfer signal, i.e. the duration of the load time intervals may be N*T where N is an integer and T is the duration of a period of the power transfer signal/drive signal.

In many embodiments, the data transmitter 509 may not only synchronize the duration of the load time intervals to the durations of the periods of the power transfer signal but may also time the start and/or stop timings of the load time intervals to the timing of the power transfer signal. Specifically, the transition times between modulation levels of the load time intervals may be synchronized to occur at zero crossings of the power transfer signal, or e.g. with a fixed offset relative to zero crossings of the power transfer signal. It will be appreciated that the synchronization may be based on the timing of the signal inducted in the receiver coil 107 by the power transfer signal.

Similarly, the power transmitter may be arranged to generate the received chip sequence from samples/measurements of the loading of the power transfer signal/drive signal (possibly after matched filtering being applied).

The load measurer 209 may specifically sample a signal of the output circuit that corresponds to the power transfer signal, such as a current and/or power of the drive signal, a relative phase between current and voltage of the drive signal, a current through the transmitter coil 103 etc. The load modulation receiver 207 may then generate the received chip sequence from the difference between such load measures at given sampling times belonging to different load time intervals of a given chip.

In many embodiments, the load measurer 209 may be arranged to synchronize the sampling to the power transfer signal, and specifically this may be achieved by synchronizing it to the drive signal.

In many embodiments, the synchronization may be of the sampling such that e.g. one sample is made per load time interval (possibly after matched filtering). Especially, if the load time interval duration is equal to N times the period of the power transfer signal, the sampling may also be synchronized to be once every N times. Thus, in many embodiments, the synchronization may be such that the sampling rate is equal to the load time interval frequency of the load modulation.

In some embodiments, the sampling may be a two stage process where a number of samples are generated at a higher frequency and then decimated to given sample rate. For example, for a load time interval duration of ten times the period of the power transfer signal, the sampler may take one sample every period. An averaging filter may then add the last ten samples, i.e. it may be a square window FIR filter that sums the ten most recent samples (with equal weights). The output of the sampling may then be the sampled output of this filter, such as specifically the output of every tenth period which coincides with the filter being a summation of the ten periods falling within a single chip. Thus, effectively the sampling at the synchronized time instants may be achieved by a suitably synchronized decimation at the output of the filter.

However, in most embodiments, only a single sampling/measurement is performed per load time interval. In such a situation the timing of the sampling may for each sample be synchronized to occur at the peak of a cycle of the signal/parameter being measured. If the load time interval and sampling is synchronized to the power transfer signal cycles, this may simply be achieved by sampling/measuring at the center time of the load time interval.

In many embodiments, the operating frequency of the drive signal and the power transfer signal may thus be an integer multiple of the sampling rate of the sampling of the signal of the output circuit and/or an integer multiple of a load time interval and chip frequency of the load modulation. The multiple may specifically be one. Indeed, in many embodiments, the integer multiple is advantageously relatively low in order to allow efficient communication and a higher data rate. In many embodiments, the integer advantageously does not exceed 1, 3, 5, 10, or 20.

Synchronization of the load modulation to the power transfer signal may in many practical implementations allow an increase of the chip rate and/or bit rate because it enables a reduction of the amount of sampling the power transmitter has to perform. In the extreme case where the chip frequency is the same as the power transfer signal frequency, the power receiver may change the load according to the chip sequence every cycle of the power transfer signal, and for two load time intervals, the load may be changed every half cycle of the power transfer signal. Alternatively, the power receiver may change the load according to the chip sequence every N-th cycle of the power signal, reducing the chip frequency by a factor N.

Synchronous modulation cases modulation detection at the power transmitter side by enabling this to apply a synchronous sampling technique and correlating the detected signal to the modulation sequence after that step. The approach may typically facilitate implementation substantially while achieving an efficient communication.

The length of the chip sequences may be selected to the specific preferences and requirements of the individual embodiment and may be selected to provide a suitable compromise between communication reliability and performance (e.g. bit rate), data rate, bandwidth, modulation depth and associated disadvantages etc. In most embodiments, a length of no less than 8 and/or no more than 128 chips will provide suitable and advantageous performance for wireless power transfer systems, such as specifically for Qi systems.

In many embodiments, the first set of chip sequences may include only two chip sequences. In such examples, each symbol may be represented by one or the other chip sequence depending on the symbol value and thus each symbol may be a binary symbol (bit) and the communication may be a binary communication.

In some embodiments, the first set of chip sequences may include more than two chip sequences and more than two different symbol values are possible. For example, in some embodiments, the first set of chip sequences may comprise, say, three chip sequences allowing three different symbol values for each symbol being communicated by a chip sequence. In other embodiments, a larger number of sequences may be included allowing each chip sequence/data symbol to represent more data values thereby increasing the effective bit rate. Such an approach may in particular be suitable for longer chip sequences where larger differences in correlation values between chip sequences are feasible.

For example, for a chip length of 31 bits, 2147483648 different sequences are possible, and the system may select two sequences out of these that have high autocorrelation and low cross-correlation. Typically, the sequences may be selected as a sequence with very high autocorrelation and the binary inverse chip sequence as this will have the lowest cross-correlation (normalized cross correlation of −1 using binary values of −1 and 1). The two sequences may then be used for binary communication allowing high reliability as the correlation performed by the load modulation receiver 207 will generate substantially different correlation values for the two possible chip sequences being received.

The specific sequences and patterns used may depend on the preferences and requirements of the individual embodiment. Typically, the sequences are selected to provide good correlation properties, and specifically the set of chip sequences is selected to consist of sequences with high autocorrelation values and low cross-correlation values. In many embodiments, chip sequences may be selected as maximum length sequences. For example, in many embodiments, chip sequences may be selected as maximum length sequences generated from a polynomial, the polynomial order chosen by the power receiver in accordance with a desired/selected modulation depth and desired communication speed. Specifically, pseudo noise sequences developed for, and used in, direct sequence spread spectrum communication and code division multiple access systems may tend to also be suitable for the described approach.

As previously mentioned, the set of sequences may comprise mirror image or inverted chip sequences, i.e. for a given binary chip sequence, the set of chip sequences may also include the chip sequence for which all chips have the complementary value. For example, if the load values are represented by 1 and −1, the set of chip sequences may for each chip sequence also include the chip sequence resulting from a multiplication by −1 (equivalent to swapping between 0 and 1 for all chips for a chip sequence represented by the values of and 0). Indeed, in some embodiments, the set of chip sequences may comprise only a chip sequence and the inverted chip sequence. It will be appreciated that in such embodiments, only a single representation needs to be stored to represent a pair of a chip sequence and the inverted chip sequence.

Such an approach may be particularly suitable for many applications and may result in good performance and low complexity. For example, a single correlation between a received chip sequence and a reference chip sequence can provide a correlation value for both the reference chip sequence and for the inverse chip sequence. Indeed, if there is no noise, the correlation value for one of the reference chip sequences may be +1 and the correlation value for the inverse reference chip sequence will then by −1. Thus, a single correlation value applicable to two symbol values/sequences can be determined and directly be used to select between the two symbols.

It will be appreciated that the approach of using inverted reference chip sequences can be considered equal to a multiplication of the binary data symbol and a single reference chip sequence (using the values of 1 and −1 to represent the binary values).

As a specific example, the system may employ the following approach:

The power receiver reduces the depth of load modulation significantly so that spurious oscillations do not occur, electrical and acoustic noise is reduced etc.

The power receiver encodes individual bits as direct (e.g., pseudorandom) chip sequences with steep autocorrelation functions.

The power receiver manipulates the load (typically changes the load or detunes the resonance circuit) synchronously with the power transfer signal (e.g., a transition per power signal cycle or a transition every multiple power signal cycles).

The power transmitter measures the load changes. e.g., by measuring the transmitter coil voltage or coil current, with a sampling time that is synchronized to the power transfer signal (e.g., one sample per power signal cycle, multiple samples per power signal cycle, or one sample per multiple power signal cycles).

The power transmitter determines a received chip sequence based on the load changes between load time intervals within the individual chip.

The power transmitter decodes the data by correlating the received chip sequence with the stored chip sequences to find a matching chip sequence and thus data symbol value.

The chip sequence and the number of power signal cycles per symbol may be known by the power receiver and the power transmitter a priori.

In the described examples, each chip has been divided into two load time intervals with different modulation loads. This may allow an efficient operation with improved performance. It may specifically allow low complexity and low resource usage while still providing substantially improved performance in many embodiments.

However, in some embodiments, each chip may be divided into three or more load time intervals that have different modulation loads.

For example, in some embodiments, each chip may be divided into three load time intervals with the load level for the first load time interval being a reference level. The load in the second load time interval may be higher than the reference level and in the third load time interval lower than the reference level for a first binary chip value. For the other binary value, the load may be lower than the reference level in the second load time interval and may be higher than the reference level in the third load time interval. The chip determiner circuit 211 may then determine a (e.g. binary) chip value may detecting whether the two load changes are present and in which direction the changes are in the individual load time intervals. Such an approach may allow improved chip value determination in different scenarios. For example, it may reduce sensitivity to the direction of load change.

In other embodiments, the use of more load time intervals with different load values may be used to represent non-binary chips. For example, having three load time intervals may allow four different chip values.

In many embodiments, each load time interval may have a duration of a single cycle of the power transfer signal. This may be advantageous in many embodiments as it may for example reduce the minimum time required per chip thereby allowing a higher data rate or e.g. longer chip sequences to be used.

However, in some embodiments, each load time interval may have a duration of a plurality cycles of the power transfer signal. In some embodiments, each load time interval may have a duration of no less than two, three, five, or ten cycles of the power transfer signal. This may be advantageous in many scenarios by e.g. facilitating or improving the measurement process. For example, the synchronization to sample peak values of the power transfer signal/drive signal may be relatively easy to achieve but the synchronization between chips and the set of cycles that correspond to each load time intervals of a chip may be more difficult. For example, the alignment between cycle peaks and load time intervals of individual chips may be disrupted resulting in the power transmitter allocating the load measurement to wrong load time intervals/chips.

For example, the determination of the next power transfer signal cycle may in many embodiments be determined by detecting zero-crossings of the power transfer signal. However, due to noise etc., it is possible that a false additional zero-crossing may be detected or (less likely) that a zero crossing may be missed. For a case where each load time interval has a duration of one power transfer signal cycle, this may result in a misalignment between the cycles/ measurements and the load time intervals of the individual chips resulting in detection errors.

However, by having a load time interval that is a duration of a plurality cycles of the power transfer signal, such errors may be mitigated.

Figure 18:
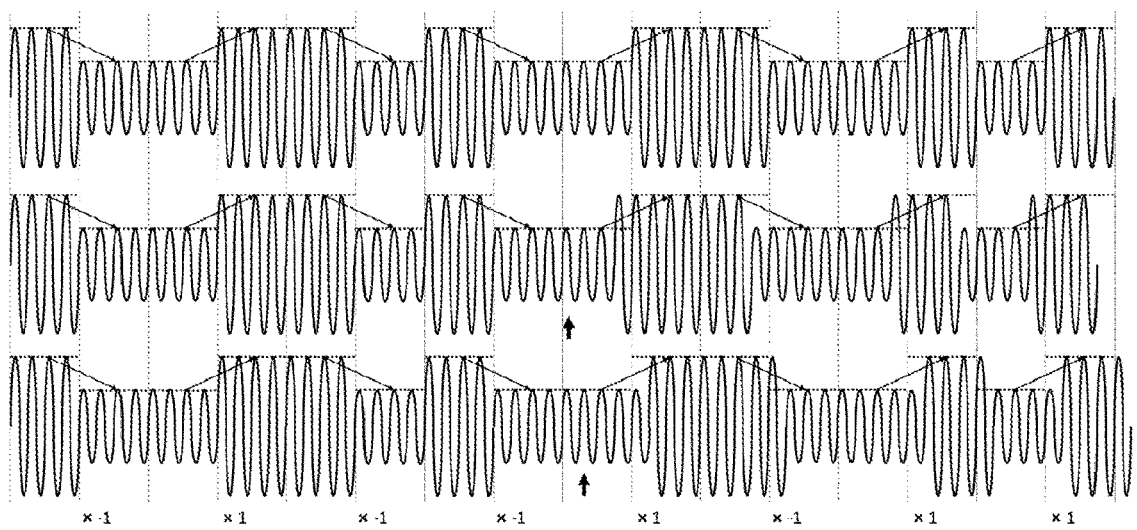
FIG. 18 illustrates an example of a load communication in a wireless power transfer system in accordance with some embodiments of the invention.

In order to increase the robustness of the approach, the number of power transfer signal cycles per chip/load time interval can be increased (at the expense of the bitrate). This may increase the resilience of the communications to the power receiver making mistakes in the detecting the starts of the power cycles and thus aligning measurements and load time intervals. An example of an approach wherein each load time interval has a duration of four power transfer signal cycles is illustrated in FIG. 18. In FIG. 18, the first row shows a situation in which the alignment between power cycles and load time intervals is correct. In the middle row, there is a one cycle offset in one direction and in the lower row there is a one cycle offset in the other direction. Although such offsets in the alignment occur, the measurements are still appropriate to the correct load time intervals and thus no detection errors are likely to occur as a result.

A modulation load may be a load component of the loading of the power transfer signal/drive signal caused by/depending on/varying with the load modulation.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. The inclusion of a feature in a dependent claim of one independent claim does not imply a limitation to this independent claim but rather indicates that the feature is equally applicable to other independent claims as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus, references to "a", "an", "first", "second" etc. do not preclude a plurality. Reference signs in the claims are provided merely as a clarifying example shall not be construed as limiting the scope of the claims in any way.

Generally, examples of the approach are indicated by below embodiments.

Embodiments

A power transmitter (101) for wirelessly providing power to a power receiver (105) via an electromagnetic power transfer signal, the power transmitter (101) comprising: an output circuit (203, 103) comprising a transmitter coil (103) arranged to generate the power transfer signal in response to a drive signal being applied to the output circuit (203, 103); a driver (201) arranged to generate the drive signal; a receiver (207) arranged to receive load modulation data symbols modulated by a chip sequence, each chip of a chip sequence being divided into at least two load time intervals having different modulation loads, the pattern of different modulation loads being different for different chip values; wherein the receiver (207) comprises: a load measurer (209) arranged to measure loading of the power transfer signal to determine measured load values for load time intervals; a chip determiner circuit (211) arranged to determine a received chip sequence from the measured load values, the received chip sequence comprising a sequence of chip values, each chip value being determined in response to a difference between measured load values for at least two modulation load time intervals of the chip; a store (215) arranged to store a set of chip sequences with each chip sequence being linked to a data symbol; a detector (213) is arranged to detect a received data symbol value in response to a correlation between the received chip sequence and chip sequences of the set of chip sequences.

A power transmitter (101) for wirelessly providing power to a power receiver (105) via an electromagnetic power transfer signal, the power transmitter (101) comprising: an output circuit (203, 103) comprising a transmitter coil (103) arranged to generate the power transfer signal in response to a drive signal being applied to the output circuit (203, 103); a driver (201) arranged to generate the drive signal; a receiver (207) arranged to receive load modulation data symbols 20) modulated by a chip sequence, each chip of a chip sequence being represented by a modulation load pattern, different chip values being represented by different modulation load patterns, and each modulation load pattern being formed by a sequence of load time intervals, a modulation load value being constant within each load time interval and changing between different time intervals; wherein the receiver (207) comprises: a load measurer (209) arranged to measure loading of the power transfer signal to determine measured load values for load time intervals; a chip determiner circuit (211) arranged to determine a received chip sequence from the measured load values, the received chip sequence comprising a sequence of chip values, each chip value being determined in response to a difference between measured load values for at least two modulation load time intervals of the chip; a store (215) arranged to store a set of chip sequences with each chip sequence being linked to a data 30) symbol; a detector (213) is arranged to detect a received data symbol value in response to a correlation between the received chip sequence and chip sequences of the set of chip sequences.

A power receiver (105) for wirelessly receiving power from a power transmitter (101) via an electromagnetic power transfer signal, the power receiver (105) comprising: an input circuit (107, 503) comprising a receiver coil (107) arranged to extract power from the power transfer signal; a transmitter (509) arranged to transmit data symbols to the power transmitter by load modulating the power transfer signal, each data symbol being modulated by a sequence of modulation load values corresponding to a chip sequence of a set of chip sequences, chip sequences of the set of chip sequences being linked to different data symbol values; wherein the transmitter is arranged to modulate the power transfer signal by dividing each chip of the chip sequence into at least two load time intervals having different modulation loads.

A power receiver (105) for wirelessly receiving power from a power transmitter (101) via an electromagnetic power transfer signal, the power receiver (105) comprising: an input circuit (107, 503) comprising a receiver coil (107) arranged to extract power from the power transfer signal; a transmitter (509) arranged to transmit data symbols to the power transmitter by load modulating the power transfer signal, each data symbol being modulated by a sequence of modulation load values corresponding to a chip sequence of a set of chip sequences, chip sequences of the set of chip sequences being linked to different data symbol values; wherein the transmitter is arranged to modulate the power transfer signal by representing each chip of a chip sequence by a modulation load pattern, different chip values being represented by different modulation load patterns, and each modulation load pattern being formed by a sequence of load time intervals, a modulation load value being constant within each load time interval and changing between different time intervals.

The invention claimed is:

1. A power transmitter comprising:
an output circuit,
wherein the output circuit comprises a transmitter coil,
wherein the output circuit is arranged to use the transmitter coil so as to generate a power transfer signal in response to a drive signal applied to the output circuit;
a driver circuit, wherein the driver circuit is arranged to generate the drive signal;
a receiver circuit,
wherein the receiver circuit arranged to receive a plurality of load modulation data symbols,
wherein the plurality of load modulation data symbols are modulated by a chip sequence,
wherein each chip of the chip sequence has a value
wherein each chip of the chip sequence has a duration,
wherein the duration of each chip of the chip sequence is divided into a plurality of load time intervals,
wherein a modulation load of the load modulation is different for consecutive time intervals of the plurality of load time intervals,
wherein a modulation load pattern is formed by modulation loads of the plurality of load time intervals,
wherein the modulation load pattern is different for each different chip value of the chip sequence;
wherein the receiver circuit, comprises:
a load measurer circuit, wherein the load measurer circuit is arranged to measure a loading of the power transfer signal so as to determine a measured load value for each of the plurality of load time intervals;
a chip determiner circuit,
wherein the chip determiner circuit is arranged to determine the chip sequence from the measured load values,
wherein each chip value is determined in response to a difference between at least two measured load values,
wherein the at least two measured load values correspond to at least two load time intervals of each chip of the chip sequence;
a memory circuit,
wherein the memory circuit is arranged to store a plurality of stored chip sequences,
wherein each chip sequence is linked to a load modulation data symbol; and
a detector circuit, wherein the detector circuit is arranged to detect a portion of the plurality of load modulation data symbols in response to a correlation between the chip sequence and at least one stored chip sequence of the plurality of stored chip sequences.

2. The power transmitter of claim 1,
wherein each chip of the chip sequence is divided into two load time intervals,
wherein the two load time intervals have different modulation loads.

3. The power transmitter of claim 1,
wherein each chip of a chip sequence is divided into at least three load time intervals,
wherein each of the at least three time intervals have different modulation loads.

4. The power transmitter of claim 1, wherein the load measurer circuit, is arranged to synchronize measurement of the load of the power transfer signal to cycles of the power transfer signal.

5. The power transmitter of claim 4, wherein each load time interval has a duration of one cycle of the power transfer signal.

6. The power transmitter of claim 4, wherein each load time interval has a duration of at least two cycles of the power transfer signal.

7. The power transmitter of claim 1, wherein the load measurer circuit is arranged to perform a single load measurement for each load time interval.

8. The power transmitter of claim 1,
wherein the chip determiner is arranged to determine a binary chip value for each chip of the chip sequence as a function of a sign,
wherein the sign is of the difference between measured load values for two load time intervals for each chip of the chip sequence.

9. The power transmitter of claim 1,
wherein the chip determiner is arranged to determine the chip sequence so as to comprise soft-decision chip values in response to a magnitude of the difference between measured load values for two load time intervals for each chip of the chip sequence, wherein the detector circuit is arranged to perform the correlation in response to the soft-decision chip values.

10. The power transmitter of claim 1, wherein the modulation load pattern is a pattern of binary modulation load values.

11. A power receiver comprising:
an input circuit comprising a receiver coil, wherein the input circuit is arranged to use the receiver coil to extract power from a power transfer signal;
a transmitter circuit,
   wherein the transmitter circuit arranged to transmit a plurality of load modulation data symbols to a power transmitter,
   wherein the plurality of load modulation data symbols are transmitted by load modulating the power transfer signal,
   wherein each load modulation data symbol of the plurality of load modulation symbols is modulated by a sequence of modulation load values,
   wherein the sequence of modulation load values corresponds to a chip sequence of a plurality of chip sequences,
   wherein the chip sequence of the plurality of chip sequences is linked to different ones of load modulation data symbol,
wherein the transmitter circuit is arranged to modulate the power transfer signal by dividing a duration of each chip of a chip sequence into a plurality of load time intervals,
wherein a modulation load of the load modulation is different for consecutive time intervals of the plurality of load time intervals,
wherein a modulation load pattern formed by modulation loads of the plurality of load time intervals is different for different chip values.

12. The power receiver of claim 11, wherein the transmitter circuit is arranged to synchronize the at least two load time intervals to cycles of the power transfer signal.

13. A method comprising:
generating a power transfer signal;
receiving a plurality of load modulation data symbols,
   wherein the plurality of load modulation data symbols are modulated by a chip sequence,
   wherein each chip of the chip sequence has a value
   wherein each chip of the chip sequence has a duration,
   wherein the duration of each chip of the chip sequence is divided into a plurality of load time intervals,
   wherein a modulation load of the load modulation is different for consecutive time intervals of the plurality of load time intervals,
   wherein a modulation load pattern is formed by modulation loads of the plurality of load time intervals,
   wherein the modulation load pattern is different for each different chip value of the chip sequence;
measuring loading of the power transfer signal so as to determine a measured load value for each of the plurality of load time intervals;
determining a chip sequence from the measured load values,
   wherein each chip value is determined in response to a difference between at least two measured load values,
   wherein the at least two measured load values correspond to at least two load time intervals of each chip of the chip sequence;
storing a plurality of chip sequences, wherein each chip sequence is linked to a load modulation data; and
detecting the load modulation data symbol of the plurality of load modulation data symbols in response to a correlation between the load chip sequence and at least one stored chip sequence of the plurality of stored chip sequences.

14. A method comprising:
extracting power from a power transfer signal; and
transmitting a plurality of load modulation data symbols to a power transmitter,
   wherein the plurality of load modulation data symbols are transmitted by load modulating the power transfer signal,
   wherein each load modulation data symbol of the plurality of load modulation data symbols is modulated by a sequence of modulation load values,
   wherein the sequence of modulation load values corresponds to a chip sequence of a plurality of chip sequences,
   wherein the chip sequence of the plurality of chip sequences is linked to different ones of the plurality of load modulation data symbols,
wherein transmitting the plurality of load modulation data symbols comprises modulating the power transfer signal by dividing a duration of each chip of a chip sequence into a plurality of load time intervals,
wherein a modulation load of the load modulation is different for consecutive time intervals of the plurality of load time intervals,
wherein a modulation load pattern formed by modulation loads of the plurality of load time intervals is different for different chip values.

15. A computer program stored on a non-transitory medium, wherein the computer program when executed on a processor performs the method as claimed in claim 13.

16. A computer program stored on a non-transitory medium, wherein the computer program when executed on a processor performs the method as claimed in claim 14.

* * * * *